United States Patent
Noguchi et al.

(10) Patent No.: US 8,411,064 B2
(45) Date of Patent: Apr. 2, 2013

(54) CONTACT DETECTING DEVICE, DISPLAY DEVICE, AND CONTACT DETECTING METHOD

(75) Inventors: Koji Noguchi, Kanagawa (JP); Koji Ishizaki, Tokyo (JP)

(73) Assignee: Sony Corporation, Tokyo (JP)

( * ) Notice: Subject to any disclaimer, the term of this patent is extended or adjusted under 35 U.S.C. 154(b) by 710 days.

(21) Appl. No.: 12/560,218

(22) Filed: Sep. 15, 2009

(65) Prior Publication Data

US 2010/0085324 A1  Apr. 8, 2010

(30) Foreign Application Priority Data

Oct. 8, 2008  (JP) ................................ 2008-261777

(51) Int. Cl.
*G06F 3/045* (2006.01)

(52) U.S. Cl. .......... 345/174; 345/87; 345/179; 345/180; 345/182; 345/183; 345/211; 345/212; 345/213

(58) Field of Classification Search ............ 345/87–100, 345/173–183, 211–213
See application file for complete search history.

(56) References Cited

U.S. PATENT DOCUMENTS

| | | | |
|---|---|---|---|
| 2008/0259044 A1* | 10/2008 | Utsunomiya et al. | 345/173 |
| 2009/0073140 A1* | 3/2009 | Fujita et al. | 345/174 |
| 2010/0073323 A1* | 3/2010 | Geaghan | 345/174 |
| 2010/0090975 A1* | 4/2010 | Nagata et al. | 345/174 |

FOREIGN PATENT DOCUMENTS

JP  2008-09750  1/2008

\* cited by examiner

*Primary Examiner* — Wayne Young
*Assistant Examiner* — Linh N Hoffner
(74) *Attorney, Agent, or Firm* — Robert J. Depke; The Chicago Technology Law Group, LLC

(57) ABSTRACT

A contact detecting device includes: n driving electrodes that are arranged in a scanning direction; a detection drive scanning unit that selects continuous m (2≦m<n) driving electrodes out of the n driving electrodes, simultaneously AC-drives the selected m driving electrodes, and repeats shift operation for changing selection targets of the m driving electrodes in the scanning direction such that one or more driving electrodes common before and after the shift operation performed each time are included in the selection targets; plural detection electrodes that form capacitors, between which and the respective n driving electrodes capacitors are formed; plural detection circuits that are connected to the plural detection electrodes and compare potentials of the detection electrodes corresponding thereto with a predetermined threshold every time the detection drive scanning unit performs the shift operation.

15 Claims, 17 Drawing Sheets

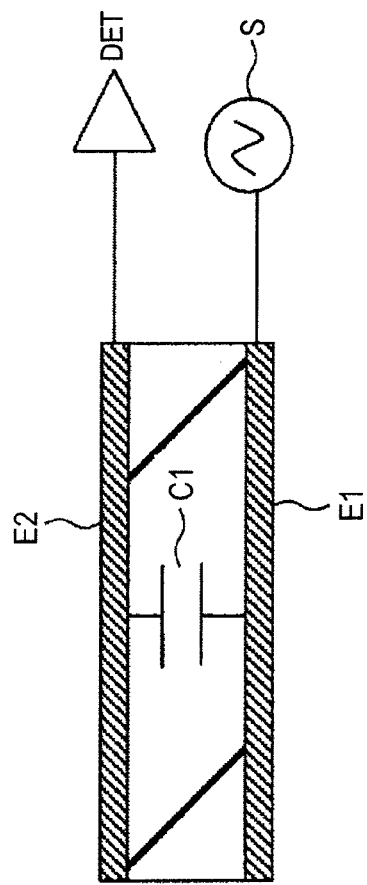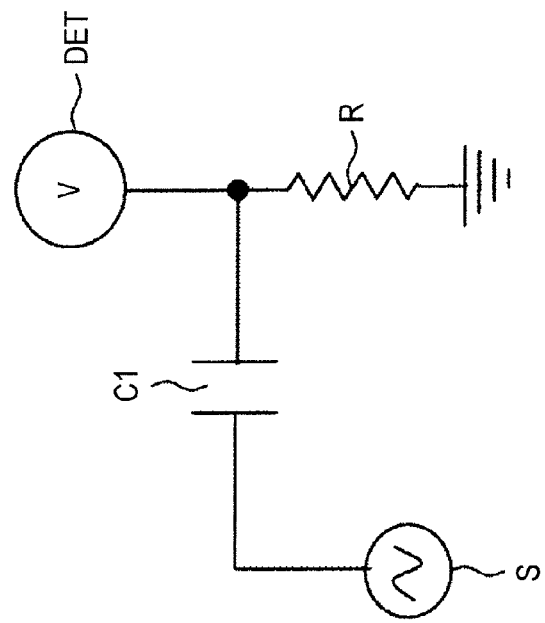
FIG.1B
FIG.1A

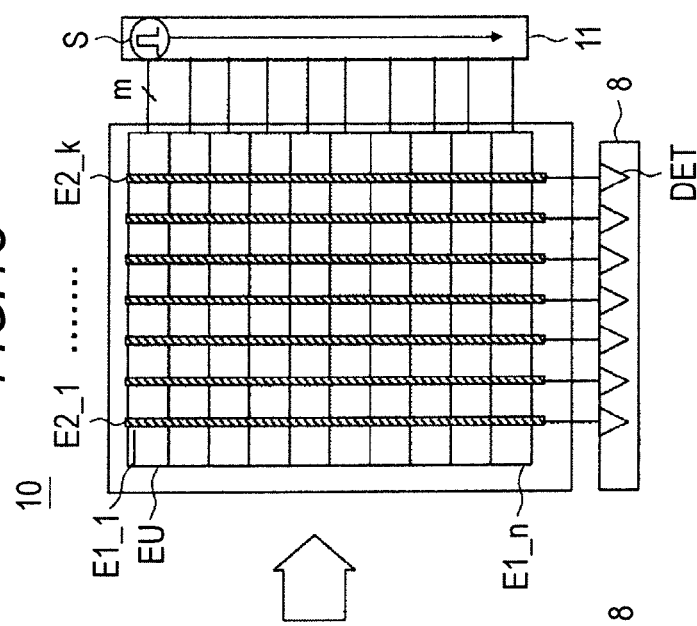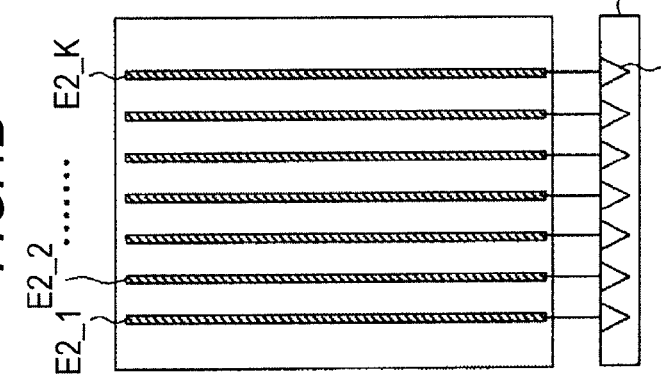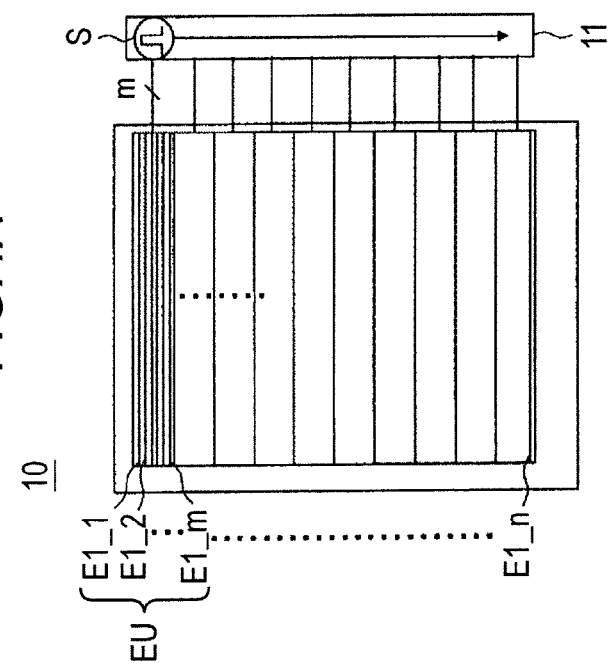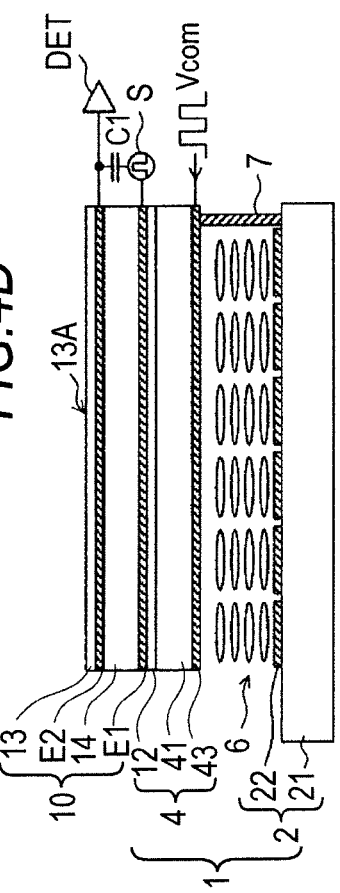

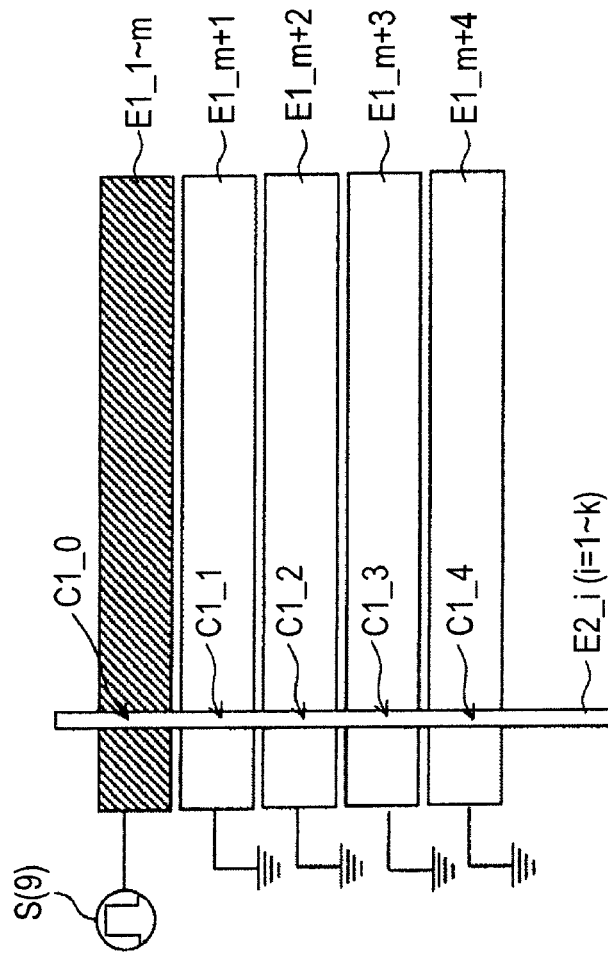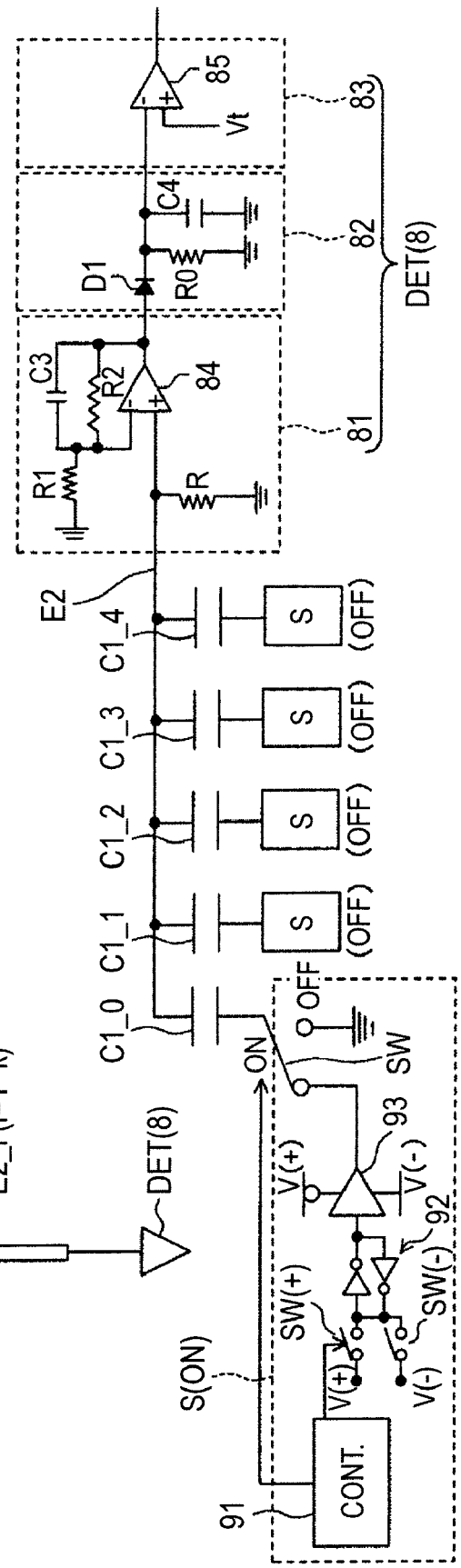
FIG.5

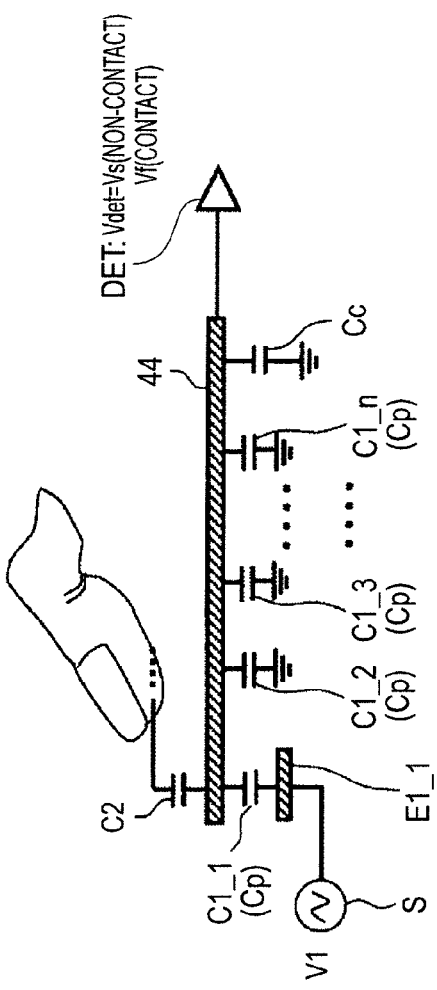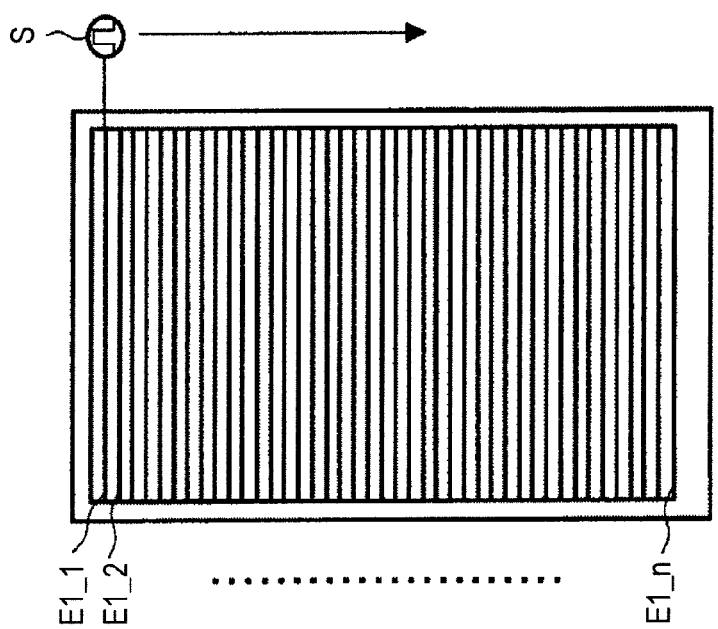

T3

T2

T1

EU (m=7)

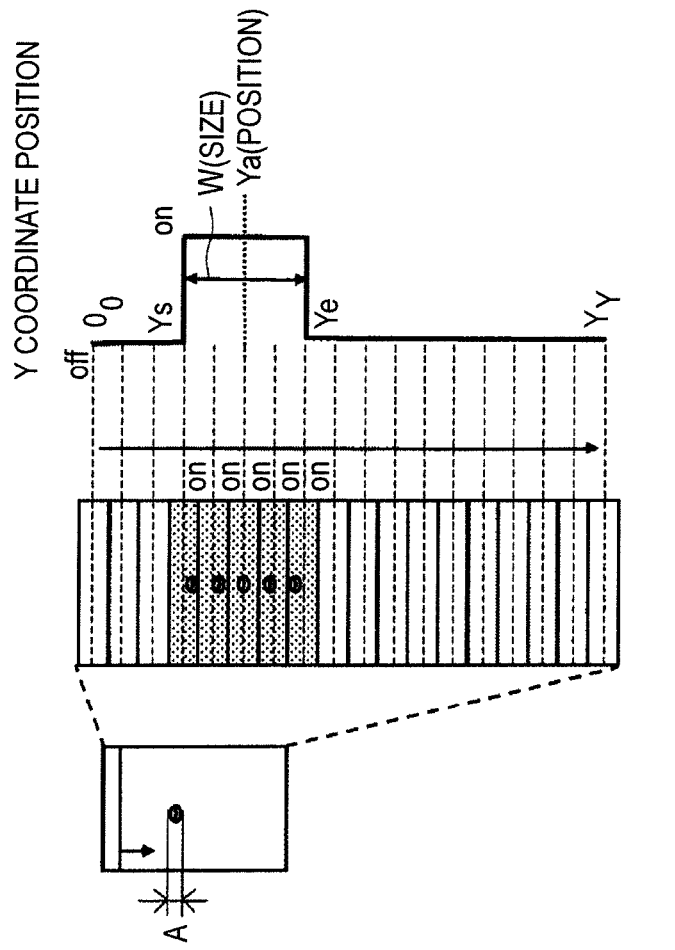
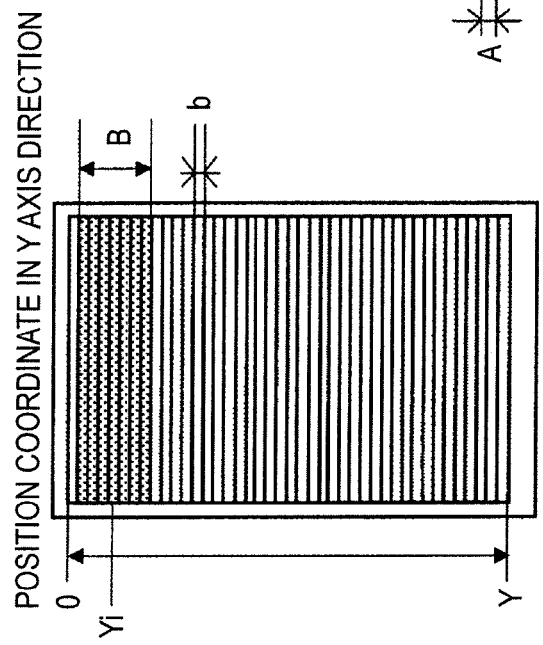
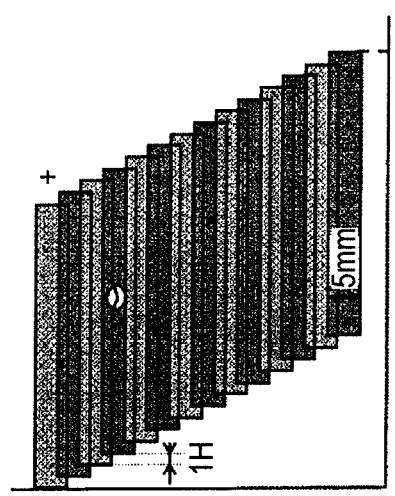

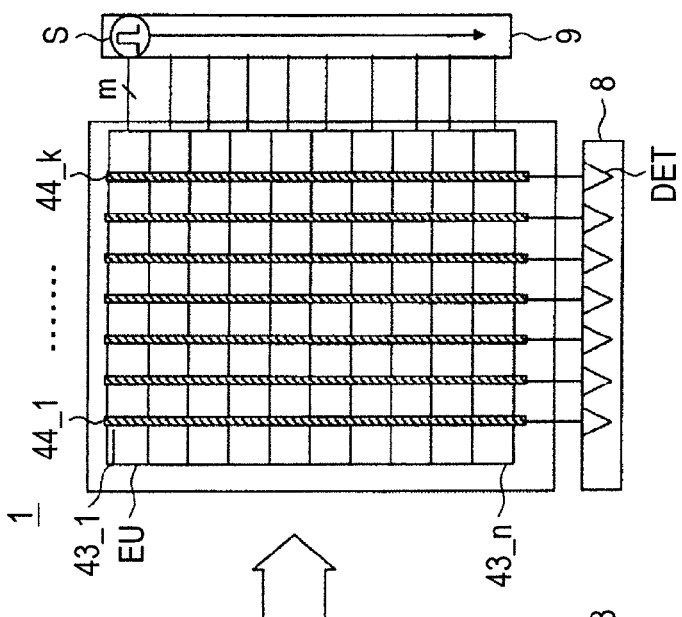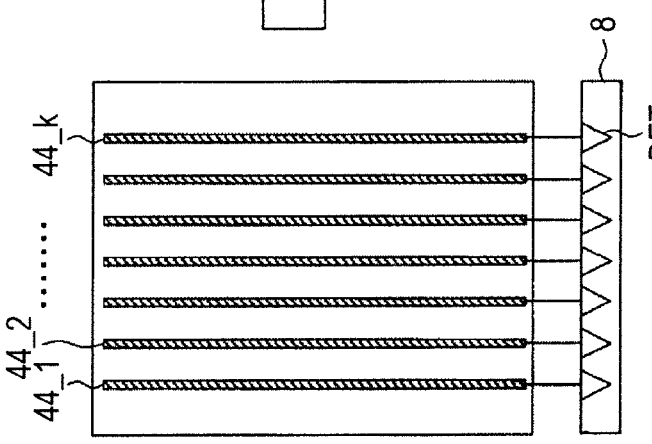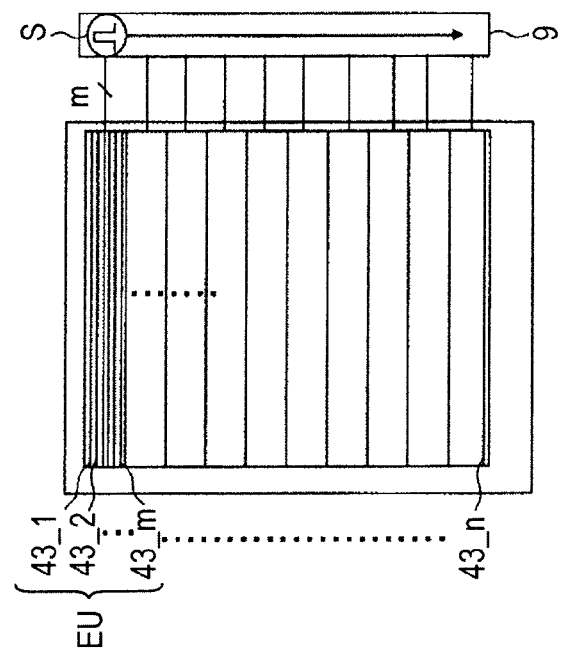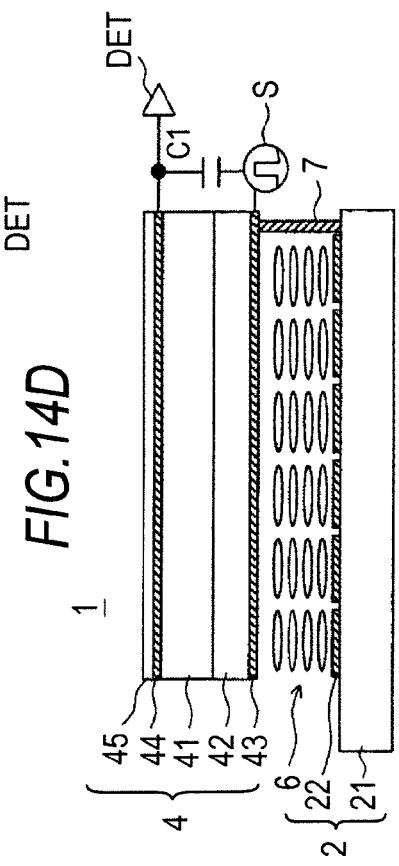

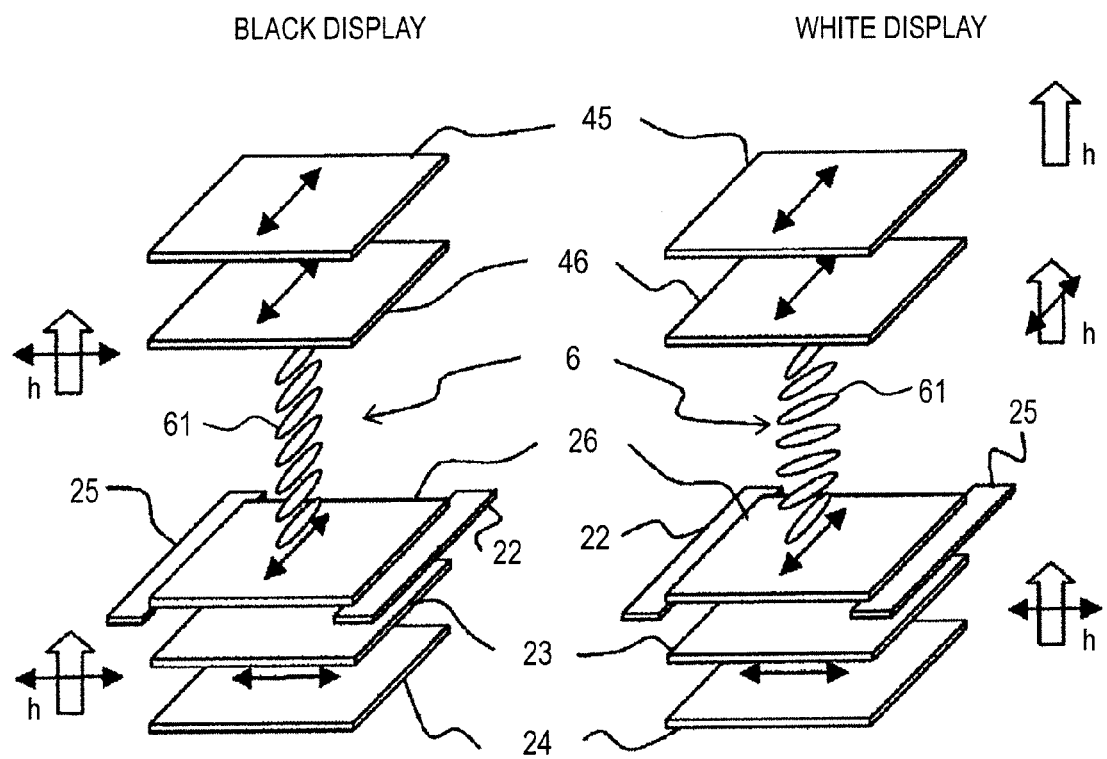
FIG.17A — BLACK DISPLAY
FIG.17B — WHITE DISPLAY

CONTACT DETECTING DEVICE, DISPLAY DEVICE, AND CONTACT DETECTING METHOD

BACKGROUND OF THE INVENTION

1. Field of the Invention

The present invention relates to a capacitance-type contact detecting device with which a user can input information by touching the device with a finger or the like and a contact detecting method. The present invention also relates to a display device that has a function of the contact detecting device.

2. Description of the Related Art

A contact detecting device called a touch panel is known. In general, the contact detecting device is a device that detects that a finger of a user, a pen, or the like comes into contact or approaches a detection surface.

On the other hand, the touch panel is formed over a display panel and displays various buttons on a display surface as images to thereby allow, acting as a substitute for normal buttons, a user to input information. Application of this technique to a small mobile apparatus, the arrangement of buttons can be shared with a display. This leads to significant merits such as an increase in size of a screen, space saving for an operation unit, and a reduction in the number of components.

In this way, in general, "touch panel" refers to a panel-like contact detecting device combined with a display device.

However, when the touch panel is provided in a liquid crystal panel, the thickness of an entire liquid crystal module increases.

Therefore, for example, JP-A-2008-9750 discloses a liquid crystal display element with a touch panel in which a conductive film for the touch panel is provided between an observation side substrate of a liquid crystal display element and a sheet polarizer for observation arranged on an outer surface of the observation side substrate and a capacitance-type touch panel having an outer surface of the sheet polarizer as a touch surface is formed between the conductive film for the touch panel and the outer surface of the sheet polarizer. A reduction in thickness of the liquid crystal display element is realized.

The capacitance-type touch sensor includes plural driving electrodes and plural detection electrodes that form capacitors in conjunction with the respective plural driving electrodes.

Sensor detection accuracy is proportional to the number of driving electrodes and the number of detection electrodes. However, if sensor output lines are provided separately from the detection electrodes, an extremely large number of wires are necessary. Therefore, in order to cause the detection electrodes to function as the sensor output lines as well, a driving method for AC-driving one of plural driving electrodes and shifting the AC-driven driving electrode in a direction in which the driving electrodes are arranged at a fixed pitch (hereinafter, scanning direction) is mainly adopted. With the method of performing scanning in one direction of the AD-driven driving electrode, when a potential change in the detection electrode is observed following the scanning, it is possible to detect, from a position during the scanning where the potential change occurs, whether a detection object comes into contact with or approaches a touch panel surface.

SUMMARY OF THE INVENTION

However, for example, in the capacitance-type touch panel disclosed in JP-A-2008-9750 or the liquid crystal display element having the function of the touch sensor, an S/N ratio in detecting a potential change in the detection electrodes and detection accuracy (resolution during detection) are in a trade-off relation.

More specifically, when an area of the driving electrodes as a unit of AC-driving is small, a potential change output from the detection electrodes is small and the S/N ratio is low.

On the other hand, when the area of the driving electrodes is set large, the width of the driving electrodes in the scanning direction increases. If the size of the touch panel in the scanning direction (panel height) is fixed, as the width of the driving electrodes is larger, the number of driving electrodes fit in the fixed panel height decreases and the resolution in the scanning direction falls. The resolution means the lower limit size of the detection object that can be detected when the size of the detection object is reduced.

Therefore, it is desirable to maintain both an S/N ratio and detection accuracy of a capacitance-type contact detecting device at high levels irrespective of whether the contact detecting device is incorporated in or externally attached to a display device.

According to a first embodiment of the present invention, there is provided a contact detecting device including n driving electrodes that are arranged in a scanning direction, a detection drive scanning unit that drives the n driving electrodes, plural detection electrodes, and plural detection circuits.

The detection drive scanning unit selects continuous m ($2 \leq m < n$) driving electrodes out of the n driving electrodes, simultaneously AC-drives the selected m driving electrodes, and repeats shift operation for changing selection targets of the m driving electrodes in the scanning direction such that one or more driving electrodes common before and after the shift operation performed each time are included in the selection targets.

Capacitors are formed between the plural detection electrodes and the respective n driving electrodes.

The plural detection circuits are connected to the plural detection electrodes and compare the potentials of the detection electrodes corresponding thereto with a predetermined threshold every time the detection drive scanning unit performs the shift operation.

With the configuration explained above, the detection drive scanning unit simultaneously AC-drives the m driving electrodes out of then driving electrodes and repeats the shift operation for changing the driving targets in the scanning direction. Every time the shift operation for changing a combination of the m driving electrodes is performed, an AC potential change is also transmitted to, via the capacitors, the plural detection electrodes, between which and the m driving electrodes the capacitors are formed. The magnitude of the AC potential change appearing in the detection electrodes at this point depends on the magnitude of capacitance. As the capacitance is larger, a larger AC potential change is obtained.

When the detection object is present near several detection electrodes, AC potential after the change in the detection electrodes takes different values because of the influence of a capacity (an external capacity) of the detection object.

In the plural detection circuits, for example, it is assumed that the threshold is set to a level that makes it possible to distinguish whether there is the influence of the external capacity. Then, the output of several detection circuits corresponding to the position of the detection object among the plural detection circuits is inverted from a logical value same as that of the output of the other detection circuits. The position of the detection object can be determined from a relation between the detection circuits in which the inversion of the output occurs and a scanning position obtained from timing when the inversion occurs.

In this operation, as explained above, the AC potential change appearing in the detection electrodes can be increased if the number of driving electrodes m is set large. Therefore, it is possible to determine the position of the detection object using a detection signal with a high S/N ratio. "Setting m large" is equivalent to, when each of the driving electrodes is AC-driven, setting the width in the scanning direction of the driving electrode large.

On the other hand, in control with the m driving electrodes set as an amount of shift for one time, the accuracy of position detection for the detection object is lower as m is larger. When detectable minimum size of the detection object is referred to as resolution, the resolution corresponds to the amount of shift for one time. When each of the driving electrodes is AC-driven, this is equivalent to "the accuracy (resolution) of position detection for the detection object is smaller as the width of the driving electrodes is larger".

In the first embodiment, the shift is performed such that one or more driving electrodes common before and after the shift operation performed each time are included in the selection targets. Therefore, position detection accuracy is high compared with the control with the m driving electrodes set as the amount of shift for one time.

In the first embodiment, attention is paid to the number of driving electrodes common before and after the shift operation performed each time. The same can be represented by the number of driving electrodes that specifies a shift amount.

Specifically, in a contact detecting device according to a second embodiment of the present invention, a detection drive scanning unit thereof performs driving operation for simultaneously AC-driving m (2≦m<n) driving electrodes continuous in the scanning direction and repeats, with size in the scanning direction of the driving electrodes smaller in number than m set as an amount of shift for one time, shift operation for changing a combination of the simultaneously-driven m driving electrodes in the scanning direction.

In the first and second embodiments, to increase the position detection accuracy most, it is advisable to repeat the shift with one driving electrode set as a unit. The detection drive scanning unit performs the shift such that (m−1) driving electrodes common in continuous AC driving for two times are included in the selection targets.

Preferably, the respective plural detection circuits are connected in a one-to-one relation to the plural detection electrodes and generate a detection signal that takes different logical values when the potentials of the detection electrodes corresponding thereto exceed the threshold and when the potentials do not exceed the threshold. When the detection signal is subjected to time sampling, a set of sampled bit values form a bitmap.

Preferably, the contact detecting device includes a detection processing unit. The detection processing unit specifies a center of gravity position of a bit changing area on the bitmap according to processing on the bitmap. The position of the detection object can be determined from the center of gravity position.

The detection processing unit may determine the size of the detection object from a range of the bit changing area on the bitmap. The detection processing unit may determine both the position and the size of the detection object.

In the contact detecting device according to the first or second embodiment, the driving electrodes can be used in common with counter electrodes for display and formed integrally with a display device.

According to a third embodiment of the present invention, there is provided a display device including plural pixel electrodes, n counter electrodes (equivalent to the driving electrodes of the contact detecting device), plural detection electrodes, a display function layer, a detection drive scanning unit, and plural detection circuits.

The plural pixel electrodes are provided for the respective pixels and planarly arranged in a matrix.

The n counter electrodes are planarly arranged to be opposed to the pixel electrodes, have pitch length natural number times as large as pitch length of an array of the pixel electrodes in a scanning direction, which is one arranging direction of the pixel electrodes, and are arranged at equal intervals in the scanning direction.

Capacitors are formed between the plural detection electrodes and the respective n counter electrodes.

The display function layer shows an image display function according to signal voltage applied between the pixel electrodes and the counter electrodes opposed to each other.

In the first embodiment, the detection drive scanning unit selects continuous m (2≦m<n) counter electrodes out of the n counter electrodes, simultaneously AC-drives the selected m counter electrodes, and repeats shift operation for changing selection targets of the m counter electrodes in the scanning direction such that one or more driving electrodes common before and after the shift operation performed each time are included in the selection targets.

In the second embodiment, the detection drive scanning unit performs driving operation for simultaneously AC-driving m (2≦m<n) counter electrodes continuous in the scanning direction and repeats, with size in the scanning direction of the counter electrodes smaller in number than m set as an amount of shift for one time, shift operation for changing a combination of the simultaneously-driven m counter electrodes in the scanning direction.

The plural detection circuits are connected to the plural detection electrodes in a one-to-one relation and compare the potentials of the detection electrodes corresponding thereto with a predetermined threshold every time the detection drive scanning unit performs the shift operation.

According to the third embodiment of the present invention, there is provided a contact detecting method including three steps explained below.

(1) Step of Driving and Scanning

In the first embodiment, continuous m (2≦m<n) driving electrodes are selected out of the n driving electrodes, the selected m driving electrodes are simultaneously AC-driven, and shift operation for changing selection targets of the m driving electrodes in the scanning direction is repeated such that one or more driving electrodes common before and after the shift operation performed each time are included in the selection targets.

In the second embodiment, driving operation for simultaneously AC-driving continuous m (2≦m<n) driving electrodes out of n driving electrodes arranged in the scanning direction is performed and shift operation for changing a combination of the simultaneously-driven m driving electrodes in the scanning direction is repeated with size in the scanning direction of the driving electrodes smaller in number than m set as an amount of shift for one time.

(2) Step of Potential Detection

The potentials of the respective driving electrodes are compared with a predetermined threshold every time the shift operation is performed in the step of driving and scanning.

(3) Step of Determination

At least one of the position and the size of a changing area in which applied voltage of capacitors formed between the n driving electrodes and the respective detection electrodes changes because of the influence of an external capacity is determined from an obtained comparison result.

According to the embodiments of the present invention, it is possible to maintain both an S/N ratio and detection accuracy of a capacitance-type contact detecting device at high levels irrespective of whether the contact detecting device is incorporated in or externally attached to a display device.

BRIEF DESCRIPTION OF THE DRAWINGS

FIGS. 1A and 1B are an equivalent circuit diagram and a schematic sectional view for explaining the operation of a touch sensor unit according to an embodiment of the present invention;

FIGS. 4A to 4D are plan views and a schematic sectional view for specifically explaining electrodes for touch detection of a contact detecting device according to a first embodiment and the arrangement of circuits for driving and detection of the electrodes;

FIG. 5 is a diagram of a circuit example of a driving signal source for sensor driving and a voltage detector in a display device according to the first embodiment;

FIGS. 6A to 6C are diagrams of a pattern of driving electrodes according to the first embodiment, an equivalent circuit diagram of a touch sensor unit including the pattern, and a formula for sensor voltage;

FIGS. 8A to 8C are diagrams for explaining a position determining method according to the first embodiment;

FIGS. 14A to 14D are plan views and a schematic sectional view for specifically explaining electrodes for touch detection of a display device according to a second embodiment of the present invention and the arrangement of circuits for driving and detection of the electrodes;

FIGS. 17A and 17B are diagrams for explaining the operation of an FFS mode liquid crystal element according to the third embodiment.

DESCRIPTION OF THE PREFERRED EMBODIMENTS

Embodiments of the present invention are explained below with reference to the accompanying drawings. A capacitance-type contact detecting device and a liquid crystal display device having a function of contact detection are main examples in the embodiments.

The basics of capacitance-type contact detection are explained as premises of the embodiments with reference to FIGS. 1A and 1B to FIGS. 3A to 3C.

Figure 2B:
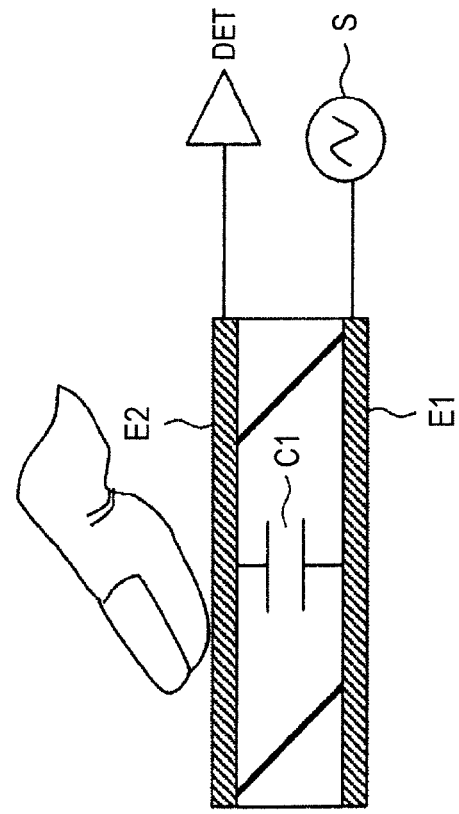
FIGS. 2A and 2B are an equivalent circuit diagram and a schematic sectional view in which a finger comes into contact with or approaches the touch sensor unit shown in FIGS. 1A and 1B.
Figure 2A:
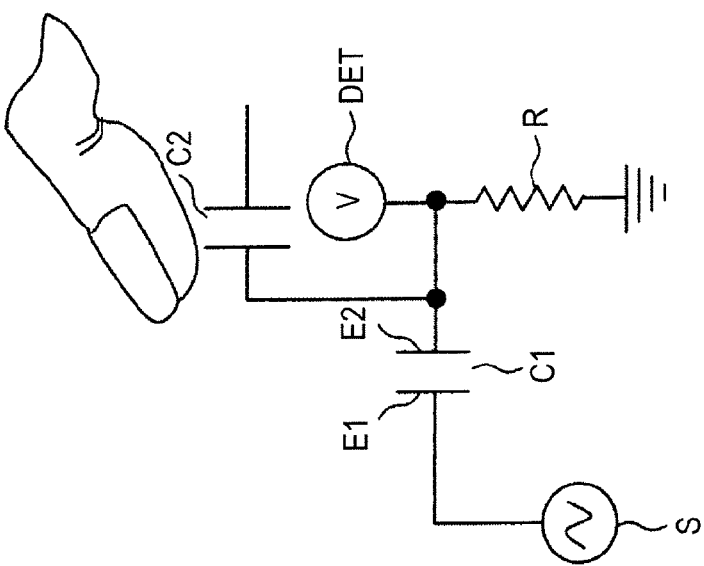

FIGS. 1A and 2A are equivalent circuit diagrams of a touch sensor unit. FIGS. 1B and 2B are diagrams (schematic sectional views) of the touch sensor unit. In FIGS. 1A and 1B, a finger as a detection object does not approach a sensor. In FIGS. 2A and 2B, the finger approaches or comes into contact with the sensor.

The touch sensor unit shown in the figures is a capacitance-type sensor. As shown in FIGS. 1B and 2B, the touch sensor unit includes a capacitative element. Specifically, a capacitative element (a capacitor) C1 includes a dielectric D and a pair of electrodes arranged to be opposed to each other across the dielectric D, i.e., a driving electrode E1 and a detection electrode E2.

As shown in FIGS. 1A and 2A, the driving electrode E1 of the capacitative element C1 is connected to a driving signal source S that generates an AC pulse signal Sg. The detection electrode E2 of the capacitative element C1 is connected to a voltage detector DET. Since the detection electrode E2 is grounded via a resistor R, a DC level is electrically fixed.

The driving signal source S applies the AC pulse signal Sg having a predetermined frequency, for example, about several kilohertz to ten to twenty kilohertz to the driving electrode E1. A waveform chart of the AC pulse signal Sg is shown in FIG. 3B.

Figure 3A:
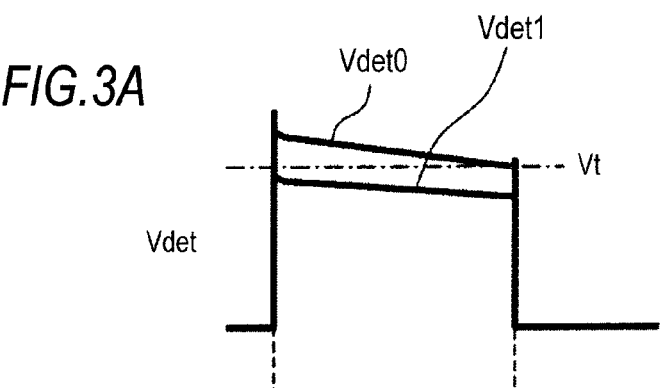
FIGS. 3A to 3C are diagrams of input and output waveforms of the touch sensor unit according to the embodiment.
Figure 3B:

A signal (a detection signal Vdet) having an output waveform shown in FIG. 3A appears in the detection electrode E2 according to the application of the AC pulse signal Sg.

As explained in detail later, in the liquid crystal display device having the function of the contact detecting device in a liquid crystal display panel, the driving electrode E1 is equivalent to a counter electrode for liquid crystal driving (an electrode opposed to a pixel electrode and common to plural pixels). For the liquid crystal driving, the counter electrode is subjected to AC driving called Vcom inverted driving. Therefore, in the embodiments of the present invention, a common driving signal Vcom for the Vcom inverted driving is also used as the AC pulse signal Sg for driving the driving electrode E1 for the touch sensor.

Figure 3C:
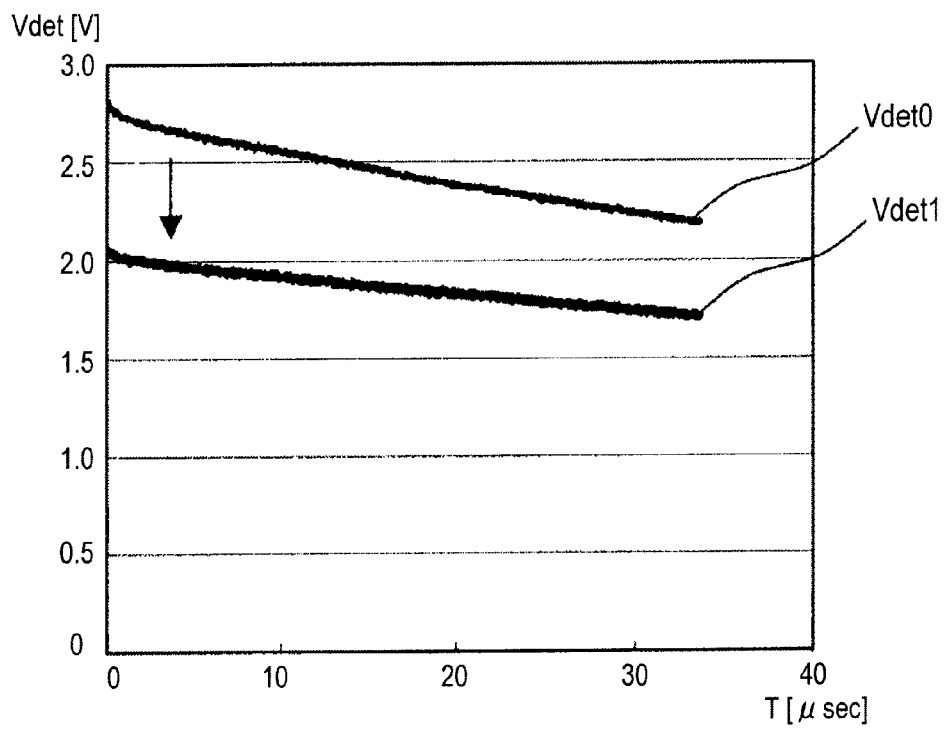

In a state shown in FIGS. 1A and 1B in which the finger does not come into contact with the sensor, the driving electrode E1 of the capacitor C1 is AC-driven. The AC detection signal Vdet appears in the detection electrode E2 according to charge and discharge of the driving electrode E1. A detection signal at this point is hereinafter represented as "initial detection signal Vdet0". The detection electrode E2 side is DC-grounded but is not grounded in terms of a high frequency. Therefore, there is no discharge path for an alternating current. A pulse wave peak value of the initial detection signal Vdet0 is relatively large. However, when time elapses after the AC pulse signal Sg rises, the pulse peak value of the initial detection signal Vdet0 gradually falls because of a loss. An enlarged waveform is shown in FIG. 3C together with a scale. The pulse peak value of the initial detection signal Vdet0 falls by about 0.5 V in the elapse of very short time because of a high-frequency loss from an initial value 2.8 V.

From this initial state, when the finger comes into contact with the detection electrode E2 or approaches the detection electrode E2 in a short distance where the finger affects the detection electrode E2, as shown in FIG. 2A, a circuit state changes to a state equivalent to a state in which a capacitive element C2 is connected to the detection electrode E2. This is because the human body becomes equivalent to a capacitor, one side of which is grounded, in terms of a high frequency.

In this contact state, a discharge path for an AC signal via the capacitive elements C1 and C2 is formed. Therefore, according to charge and discharge of the capacitive elements C1 and C2, alternating currents I1 and I2 respectively flow to the capacitive elements C1 and C2. Therefore, the initial detection signal Vdet0 is divided into a value determined by, for example, a ratio of the capacitive elements C1 and C2. The pulse peak value falls.

A detection signal Vdet1 shown in FIGS. 3A and 3C is a detection signal that appears in the detection electrode E2 when the finger comes into contact with the detection electrode E2. It is seen from FIG. 3C that an amount of fall of the detection signal is about 0.5 V to 0.8 V.

The voltage detector DET shown in FIGS. 1A and 1B and FIGS. 2A and 2B detects the contact of the finger by detecting the fall of the detection signal using, for example, a threshold Vt.

First Embodiment

A contact detecting device according to a first embodiment of the present invention is explained below. As an example, the contact detecting device is a capacitance-type touch panel that can be externally attached to a display panel.

FIGS. 4A to 4C are plan views for specifically explaining electrodes of the contact detecting device according to this embodiment and circuits for driving and detection of the electrodes. FIG. 4D is a schematic sectional view of the sectional structure of the contact detecting device according to this embodiment externally attached to a display surface side of a liquid crystal display panel. In FIG. 4D, a section for six pixels in, for example, a row direction (a pixel display line direction) is shown.

In FIG. 4D, to facilitate understanding of the sectional structure, counter electrodes, pixel electrodes, and detection electrodes are hatched. However, concerning other sections (substrates, insulating films, functional films, etc.), the hatching is omitted. The hatching is omitted in other section structure diagrams referred to below.

Details of the liquid crystal display panel shown in FIG. 4D are explained in other embodiments later. Therefore, reference numerals and signs used in the explanation are affixed. However, in this embodiment, detailed explanation of the liquid crystal display panel itself is omitted.

The liquid crystal display panel shown in FIG. 4D includes a substrate to which a signal for driving of pixels is mainly supplied (hereinafter referred to as driving substrate 2), a counter substrate 4 arranged to be opposed to the driving substrate 2, and a liquid crystal layer 6 arranged between the driving substrate 2 and the counter substrate 4.

The contact detecting device according to this embodiment (hereinafter referred to as touch panel 10) is bonded on the counter substrate 4 via a bonding layer 12.

The touch panel 10 includes a driving electrode E1 on the liquid crystal display panel side and a detection electrode E2 superimposed on the driving electrode E1 via a dielectric layer 14. A protective film 13 is formed on the detection electrode E2.

A "detection surface 13A" indicates a top surface of the protective layer 13.

In a state in which the touch panel 10 is bonded on a liquid crystal display panel 1 as shown in FIG. 4D, display light is emitted to a user side through the touch panel 10. Therefore, the detection surface 13A is a display surface.

The driving electrode E1 and the detection electrode E2 are divided in directions orthogonal to each other as shown in FIGS. 4A to 4C.

When the detection surface 13A is viewed through from the user side, as shown in FIG. 4A, a predetermined number m of driving electrodes E1 are arranged. In FIG. 4A, n driving electrodes E1 are denoted by reference signs "E1_1, E1_2, ..., E1_m, ..., and E1_n". "m" is an integer smaller than "n" and equal to or larger than two.

The driving electrodes E1_1 to E1_n have a belt shape having relatively small width and are arranged parallel to one another. In the touch panel 10 externally attached to the display device, the width (the size in a scanning direction) of the driving electrodes can be specified irrespective of pixel size. As the width of the driving electrodes is set smaller, detection accuracy or resolution of object detection increases.

Among the driving electrodes E1_1 to E1_n divided into n, m ($2 \leq m < n$) driving electrodes are simultaneously driven.

A bundle of the simultaneously-driven driving electrodes is represented as AC driving electrode unit EU. In this embodiment, the number of driving electrodes included in one AC driving electrode unit EU is a fixed number m. While a combination of the driving electrodes is changed with a part thereof superimposed, the AC driving electrode unit EU is shifted stepwise in a column direction. A direction of the shift is a longitudinal direction of the paper surface of FIGS. 4A to 4C. This direction is referred to as scanning direction. Operation for shifting a combination of the driving electrodes selected as a bundle of continuous driving electrodes in one direction is referred to as scanning.

In the scanning, a combination of the driving electrodes selected as the AC driving electrode unit EU changes in each shift.

In continuous two times of selection performed before and after the shift is performed once, one or more driving electrodes are redundantly selected. When a shift amount is represented by the number of driving electrodes, a range of the shift amount corresponds to the number of driving electrodes equal to or larger than 1 and equal to or smaller than (m−1).

The operation of AC driving with such an AC driving electrode unit EU of the driving electrodes set as a unit and the shift operation for the AC driving electrode unit EU are performed by a detection drive scanning unit 11.

The shift amount is desirably a minimum amount equivalent to one driving electrode because the detection accuracy and the resolution of a detection object can be set highest. This desirable minimum shift amount is a premise of the explanation below. The operation of the detection drive scanning unit 11 under this premise can be regarded as equal to "operation for moving the driving signal source S (see FIGS. 1A and 1B and FIGS. 2A and 2B), which simultaneously AC-drives the m driving electrodes, in the column direction and performing scanning in the column direction while changing, one by one, the driving electrode to be selected". An arrow drawn from the driving signal source S in FIGS. 4A and 4C schematically indicates the scanning of the signal source.

On the other hand, the detection electrode E2 is formed by a predetermined number k of conductive layers arranged in a parallel stripe shape long in a direction orthogonal to the driving electrodes E1. The respective detection electrodes having the parallel stripe shape are referred to as "detection lines". In FIGS. 4B and 4C, the detection lines are denoted by reference signs "E2_1 to E2_k".

A detecting unit 8 is connected to one ends of the k detection lines E2_1 to E2_k arranged as explained above. A basic detection unit of the detecting unit 8 is the voltage detector DET as a "detection circuit" shown in FIGS. 1A and 1B and FIGS. 2A and 2B. The respective k detection lines E2_1 to E2_k are connected to the voltage detector DET corresponding to the detecting unit 8. Therefore, the voltage detector DET can detect the detection signal Vdet (see FIGS. 3A to 3C) from the detection lines.

FIG. 5 is a diagram of a configuration example of the detecting unit 8, which performs touch detecting operation, and an electrode pattern indicating the position of a detection target.

In FIG. 5, the driving electrodes E1_1 to E1_m indicated by hatching are connected to the driving signal source S and selected. The other driving electrodes E1_m+1 to E1_m+4 are maintained at GND potential. A state in which the driving electrodes are selected is also referred to as ON state and a state in which the driving electrodes are maintained at the GND potential and not selected is also referred to as OFF state. Actually, there are the m ($\geq$2) driving electrodes in the ON state. Therefore, only the driving electrodes E1_1 to E1_m shown in FIG. 5 represent the aggregate of the m driving electrodes.

In FIG. 5, the voltage detector DET connected to a certain detection line E2_i (i=1 to k) that crosses the driving electrode group and a circuit diagram of the driving signal source S are shown. Capacitive elements C1_0 to C1_4 are formed in crossing sections of the detection line E2_i and the driving electrodes.

The driving signal source S shown in FIG. 5 includes a control unit 91, two output switches SW(+) and SW(-), a latch circuit 92, a buffer circuit (a waveform shaping unit) 93, and an output switch SW.

The control unit 91 is a circuit that controls the two output switches SW(+) and SW(-) in which plus voltage V(+) and minus voltage V(-) switch, respectively, and the output switch SW. Even if the control unit 91 is not provided in the driving signal source S, an external CPU or the like can be substituted for the control unit 91.

The output switch SW(+) is connected between the plus voltage V(+) and an input of the latch circuit 92. The output switch SW(-) is connected between the minus voltage V(-) and the input of the latch circuit 92. An output of the latch circuit 92 is connected to an ON side node of the output switch SW via a buffer circuit 93. The buffer circuit 93 is a circuit that outputs input potential with the input potential guaranteed at the plus voltage (+) and the minus voltage V(-).

The output switch SW is controlled by the control unit 91 to turn on the driving signal source S (a selected state or an active state) or inactively connect the driving signal source S to GND. Because this function of the control unit 91 is synchronized with the control of other driving signal sources, the function is usually carried out by, for example, feeding forward, with a shift resistor or the like, a signal selected by shifting a group of driving signal sources S to be inactivated.

The voltage detector DET is connected to a detection line E2 to which the capacitive elements C1_0 to C1_4 are connected.

The voltage detector DET shown in FIG. 5 includes an OP amplifier circuit 81, a rectifying circuit 82, and an output circuit 83.

The OP amplifier circuit 81 includes an OP amplifier 84, resistors R1 and R2, and a capacitor C3 as shown in the figure to form a filter circuit for noise removal. An amplification ratio of the filter circuit is determined by a ratio of resistances or the like. The filter circuit also functions as a signal amplifying circuit.

The detection line E2 is connected to a non-inverting input "+" of the OP amplifier 84. The detection signal Vdet is input from the non-inverting input "+". The detection line E2 is connected to ground potential via the resistor R in order to electrically fix a DC level of the potential thereof. The resistor R2 and the capacitor C3 are connected in parallel between an output of the OP amplifier 84 and an inverting input "−". The resistor R1 is connected between the inverting input "−" of the OP amplifier 84 and the ground potential.

The rectifying circuit 82 includes a diode D1 that performs half-wave rectification, a charging capacitor C4, and a discharging resistor R0. An anode of the diode D1 is connected to an output of the OP amplifier circuit 81. The charging capacitor C4 and the discharging resistor R0 are connected between a cathode of the diode D1 and the ground potential. A smoothing circuit is formed by the charging capacitor C4 and the discharging resistor R0.

The potential of the cathode of the diode D1 (an output of the rectifying circuit 82) is read out as a digital value via the output circuit 83. In the output circuit 83 shown in FIG. 5, only a comparator 85 that executes comparison of a threshold and voltage is shown. The output circuit 83 also has a function of an AD converter. Concerning the AD converter, a type such as a resistance ladder type or a capacitance division type is arbitrary. The output circuit 83 compares an input analog signal with the threshold Vt (see FIG. 3A) using the comparator 85. The comparator 85 may be realized as a function of a control circuit (not shown in the figure) such as a CPU. A result of the comparison is used by various applications as a signal indicating whether the touch panel 10 is touched, for example, a signal indicating presence or absence of button operation.

The threshold Vt as reference voltage of the comparator 85 can be changed by the control unit such as the CPU. The comparator 85 detects the potential of the detection signal Vdet using the threshold Vt. A not-shown "detection processing unit" including a CPU or the like can determine the position and the size of a detection object on the basis of the detected potential. Details of processing for the determination of the position and the size of the detection object and a method for the determination are explained later.

Shift and AC driving of selected m driving electrodes (AC driving electrode units EU) by the detection drive scanning unit 11 are explained with reference to the drawings.

The driving electrodes E1_1 to E1_n divided in pixel display line units (also referred to as writing units) are shown in FIG. 6A. An equivalent circuit diagram of the touch sensor unit during the driving of the driving electrode E1_1, which is a first one of the driving electrodes E1_1 to E1_n, is shown in FIG. 6B.

As shown in FIG. 6A, the driving electrode E1_1 is connected to the driving signal source S to thereby be AC-driven. At this point, in the touch sensor unit, an equivalent circuit shown in FIG. 6B is formed as explained above. Capacitance values of the capacitive elements C1_0 to C1_n are represented as "Cp", capacitance components (parasitic components) connected to the detection electrode E2 other than the capacitive elements C1_0 to C1_n are represented as "Cc", and an effective value of AC voltage by the driving signal source S is represented as "V1".

The detection signal Vdet detected by the voltage detector DET at this point is voltage Vs when the finger is not in contact and is voltage Vf when the finger is in contact. The voltages Vs and Vf are hereinafter referred to as sensor voltages.

The sensor voltage Vs during non-contact is represented by a formula shown in FIG. 6C. According to the formula, when the number of divisions n of the driving electrodes E1 is large, the capacitance values Cp are small. The denominator of the formula shown in FIG. 6C does not substantially change because "nCp" is substantially fixed. However, the numerator decreases. Therefore, as the number of divisions n of the driving electrode E1 increases, the magnitude of the sensor voltage Vs (an effective value of an alternating current) decreases.

Therefore, in order to set an S/N ratio larger to some degree, the number of divisions n should not be set too large.

On the other hand, when the number of divisions n is small and an area of one driving electrode E1_1 is large, the detection accuracy of the detection object falls.

Therefore, in this embodiment, as explained above, the number of divisions is set large and the width (the length in the scanning direction) of the respective driving electrodes is set small. Plural driving electrodes are simultaneously AC-driven. A part of the driving electrodes are continuously selected twice. Consequently, the fall of the sensor voltage (the fall of the S/N ratio) due to the large number of divisions n and the securing of high detection accuracy are simultaneously attained.

Figure 7C:
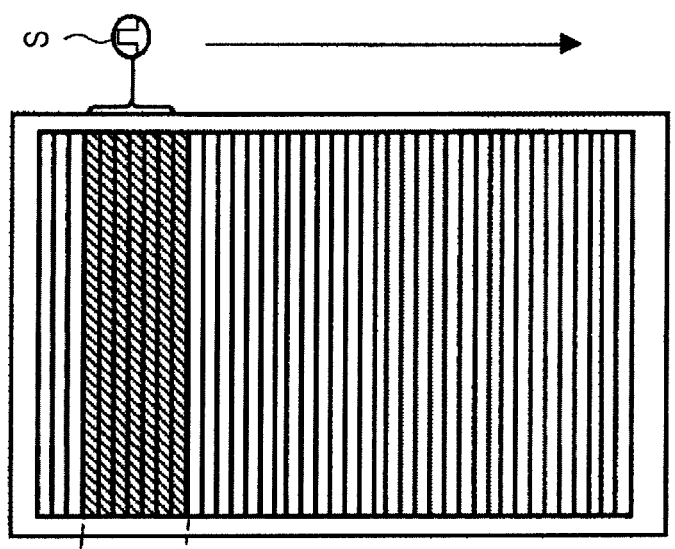
FIGS. 7A to 7C are plan views of selection of the driving electrodes according to the first embodiment (determination of an electrode group simultaneously AC-driven) and a state of shift (reselection) of the driving electrodes.
Figure 7B:
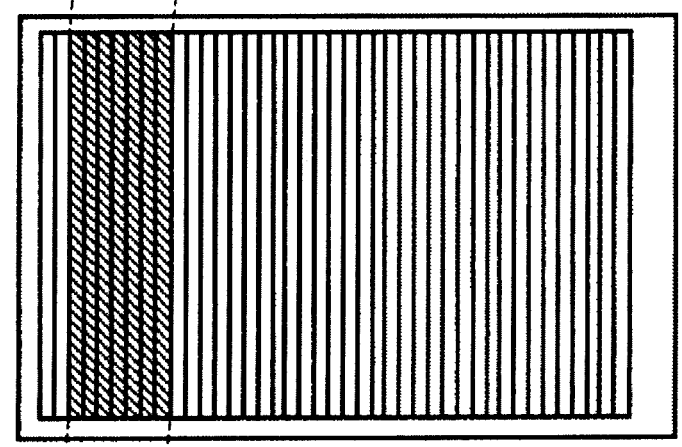
Figure 7A:
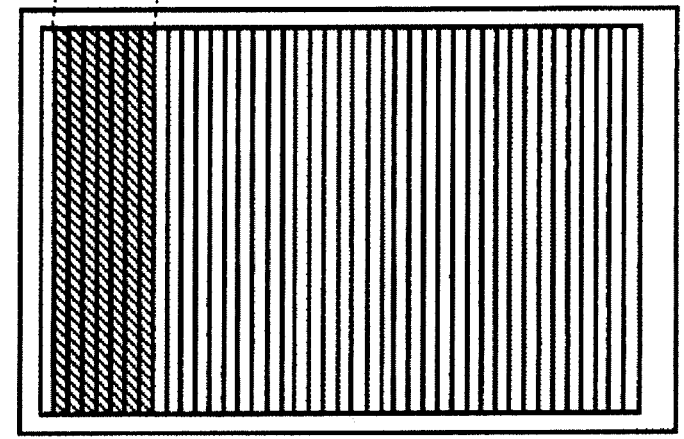

FIGS. 7A to 7C are diagrams for explaining the AC driving and the shift operation.

In FIGS. 7A to 7C, the AC driving electrode unit EU includes seven counter electrodes indicated by hatching. The transition of a selection range at the time when the AC driving electrode unit EU is shifted in the column direction with one driving electrode set as a unit is shown in FIGS. 7A to 7C.

At time T1 in FIG. 7A, first one driving electrode is unselected. However, second to eighth driving electrodes are selected and simultaneously AC-driven by the driving signal source S. At the next cycle (time T2), the AC driving electrode unit EU is shifted by one driving electrode. First and second two driving electrodes are unselected, third and subsequent seven driving electrodes are selected, and the other driving electrodes are unselected. At the next cycle (time T3), the AC driving electrode unit EU is further shifted by one driving electrode. First to third driving electrodes are unselected, fourth and subsequent seven driving electrodes are selected, and the other driving electrodes are unselected.

Thereafter, the shift and the AC driving are repeated in the same manner.

According to this operation, a value of n in the formula shown in FIG. 6C is reduced to $1/7$ of an actual number of divisions. An effective value of the sensor voltage Vs increases because of the reduction in the value of n. On the other hand, as shown in FIGS. 7A to 7C, a unit (a shift amount) of new inclusion in a selected group (the AC driving electrode unit EU) and exclusion from the selected group due to the inclusion is one driving electrode. Therefore, the shift amount of the AC driving electrode unit EU moves in a minimum unit and the detection signal Vdet is output every time the shift amount moves. Therefore, comparison of the detection signal Vdet and the threshold Vt is frequently performed and the number of divisions n of the driving electrodes is increased. As a result, high detection accuracy is obtained.

Basic Concept of a Determining Method

A basic concept of a method of determining the position and the size of the detection object based on a comparison result of the detection signal Vdet and the threshold Vt is explained with reference to FIGS. 8A to 8C.

The width of the driving electrodes and the width of the AC driving electrode unit EU in a position coordinate in the scanning direction (a Y axis direction) are shown in FIG. 8A.

The width in the Y axis direction of the AC driving electrode unit EU is hereinafter referred to as "border width B". When the width of the driving electrode E1 is represented as "b", since the number of driving electrodes included in the border width B is m, B=m×b.

Operation in scanning a screen of one frame by AC-driving, width B with a shift amount of the driving electrode width b, the AC driving electrode unit EU having the border is schematically shown in FIG. 8B.

A time interval between start times of one AC driving and the next AC driving is arbitrary. When the AC driving is associated with the display device explained later, this time interval can be set to, for example, one horizontal display period (1H). In this case, since one frame is 16.7 msec, the number of AC driving electrode units EU (the number of borders) switched in one frame is determined by the number of driving electrodes n in the Y axis direction and the number of driving electrodes m in the border width B.

An example of an output waveform of the comparator 85 shown in FIG. 5 and an overview of the method of determining the position and the size of the detection object are shown in FIG. 8C. This determination is performed by the "detection processing unit" including the CPU or the like not shown in FIG. 5.

In the example shown in FIG. 8C, AC driving shift is performed eighteen times in total. In the first three times of the AC driving shift, an output bit of the comparator 85 shown in FIG. 5 remains at an initial level (an OFF level). An input change of the comparator 85 caused between the AC driving in the third time and the AC driving in the fourth time occurs across levels of the threshold Vt. Therefore, the output bit of the comparator 85 changes from an OFF level to an ON level. Timing when the output bit of the comparator 85 changes from OFF to ON is determined according to how many times the AC driving is performed after the first AC driving. Specifically, since time width for performing the AC driving once is determined in advance, by counting time from the first AC driving (the start of scanning), it is possible to check how many times the AC driving is perform when the output bit change occurs. It is assumed that the output bit change occurs in the center of the border width B. A position on the Y axis where the output bit changes from OFF to ON (hereinafter referred to as first edge position Ys) is calculated from a relation between the number of borders from the start of scanning until the output bit change occurs and the border width B.

In the example shown in FIG. 8C, the output bit returns from ON to the initial state OFF in a fourth border counted from the border (the AC driving electrode unit EU) in which the output bit changes from OFF to ON. It is assumed that the output bit change occurs in the center of the border width B at the time when the output bit returns from ON to OFF.

Like the first edge position Ys, a position on the Y axis where the output bit returns from ON to OFF (hereinafter referred to as second edge position Ye) is calculated from a relation between the number of borders from the start of scanning until the output bit change occurs and the border width B.

The not-shown "detection processing unit" including the CPU or the like calculates the first edge position Ys and the second edge position Ye. The "detection processing unit" calculates a center position Ya of the detection object according to a formula Ya=(Ye+Ys)/2. The "detection processing unit" calculates size W in the Y axis direction of the detection object according to a formula W=(Ye−Ys).

According to a way of setting the threshold Vt, the size W of the detection object (in this example, the finger) calculated by the method explained above can be set substantially the same as actual size A in the Y axis direction of the detection object. Conversely, according to whether the detection object is the finger or a stylus pen, the "detection processing unit" individually calculates the threshold Vt in advance such that the sizes coincide with each other in this way. The "detection processing unit" may change the threshold Vt output to the comparator 85 according to a type of the detection object estimated from an absolute value of the size W, for example, a difference of the finger or the stylus pen.

Figure 9C:
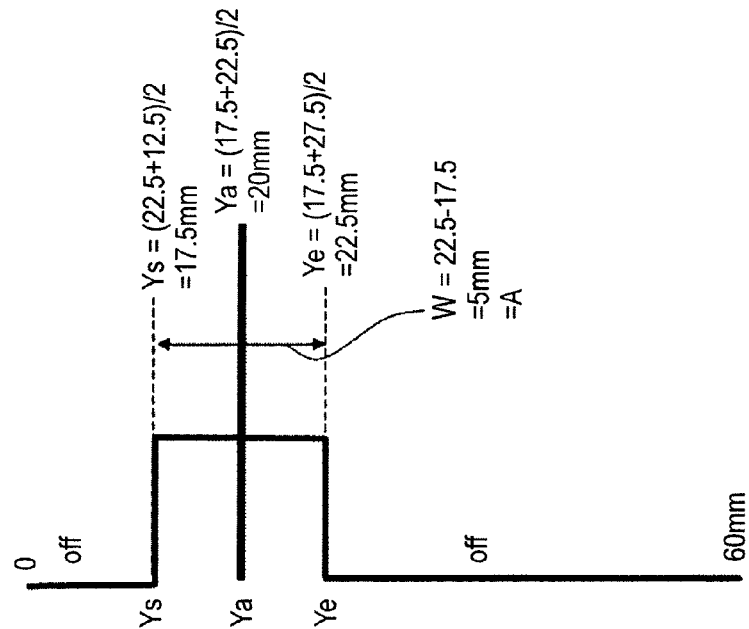
FIGS. 9A to 9C are diagrams of an example of the position detecting method shown in FIGS. 8A to 8C embodied by setting numerical values.
Figure 9B:
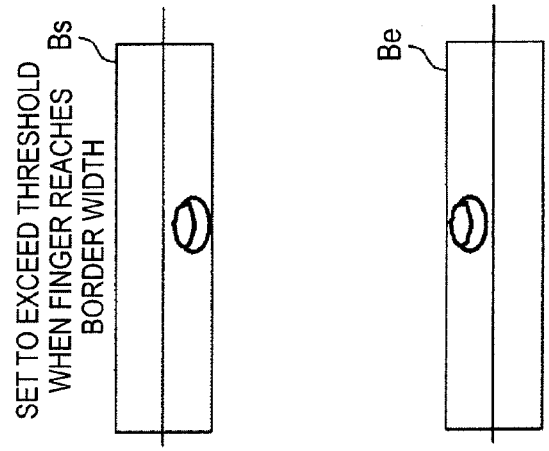
Figure 9A:
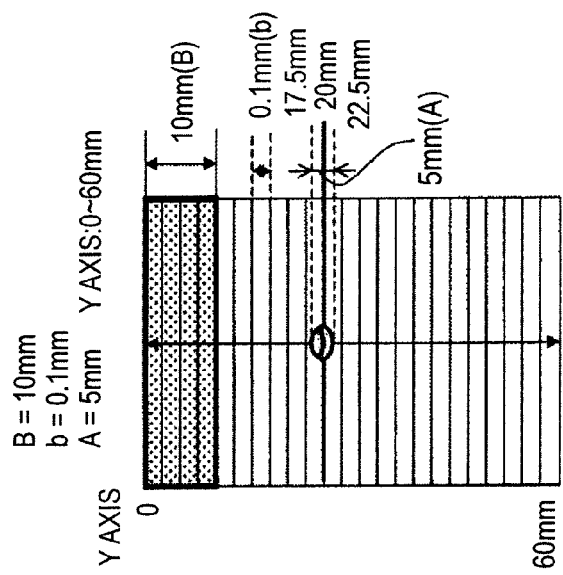

An example in which more specific numerical values are set in the basic concept of the determining method is shown in FIGS. 9A to 9C.

Examples of border width, a shift amount of a border, and the size of the finger are shown in FIG. 9A. It is assumed that the border width B is 10 mm, the shift amount (the width of the driving electrodes) b is 0.1 mm, and the size A in the Y axis direction of the finger is 5 mm. It is assumed that a moving range of the border is 60 mm at the maximum from the origin of the Y axis.

FIG. 9B is a schematic diagram of a specific example of threshold setting. As shown in FIG. 9B, the threshold Vt is set such that the output bit of the comparator 85 changes from OFF to ON when the detection object (the finger) is completely included in border width Bs for the first time during scanning. Under the threshold Vt set in this way, the output bit of the comparator 85 changes from ON to OFF at an instance when the finger deviates from a state in which the finger is completely included in border width Be.

It is assumed that a rear (origin side) edge coordinate of the border width Bs at the time when the threshold Vt shown in FIG. 9B is defined is 22.5 mm and a front edge coordinate thereof is 12.5 mm. It is assumed that a rear edge coordinate of the border width Be at the time when the output bit returns to OFF is 17.5 mm and a front edge coordinate thereof is 27.5 mm.

In this case, the first edge position Ys at the time when the output bit changes to ON is a center coordinate of the border width Bs. As shown in FIG. 9C, the first edge position Ys is calculated as 17.5 mm. Similarly, the second edge position Ye at the time when the output bit returns to OFF is a center coordinate of the border width Be. As shown in FIG. 9C, the second edge position Ye is calculated as 22.5 mm.

In this case, the center position Ya of the detection object (the finger) is calculated as Ya=(Ye+Ys)/2=20 mm. The size W in the Y axis direction of the detection object (the finger) is W=(Ye−Ys)=5 mm and coincides with the actual size A of the finger.

As explained above, the center coordinate and the size in the scanning direction of the detection object can be accurately measured.

In principle, resolution in an X axis direction orthogonal to the Y axis can be set as high as possible by simply increasing the number k of detection lines E2 shown in FIGS. 4B and 4C and the number of voltage detectors DET connected to the detection lines in a one-to-one relation.

Consequently, extremely fine position detection can be performed by using the method of driving and contact detection according to this embodiment.

The above explanation is on the premise that the voltage detector DET is provided in the touch panel 10. However, the voltage detector DET can be provided outside the touch panel 10.

In the former case, the touch panel 10 can be an example of the "contact detecting device" according to this embodiment. On the other hand, in the latter case, a section including the touch panel 10 and the voltage detector DET outside the touch panel 10 is an example of the "contact detecting device" according to this embodiment.

According to the above explanation, a method for the contact position detection and driving of the contact detecting device according to this embodiment is an example of a method including three steps explained below.

(1) Step of Driving and Scanning

In the first embodiment, continuous m (2≦m<n) driving electrodes are selected out of n driving electrodes, the selected m driving electrodes are simultaneously AC-driven, and shift operation for changing selection targets of the m driving electrodes in the scanning direction is repeated such that one or more driving electrodes common before and after the shift operation performed each time are included in the selection targets.

In the second embodiment, driving operation for simultaneously AC-driving continuous m (2≦m<n) driving electrodes out of n driving electrodes arranged in the scanning direction is performed and shift operation for changing a combination of the simultaneously-driven m driving electrodes in the scanning direction is repeated with size in the scanning direction of the driving electrodes smaller in number than m set as an amount of shift for one time.

(2) Step of Potential Detection

The potentials of the respective driving electrodes are compared with a threshold every time the shift operation is performed in the step of driving and scanning.

(3) Step of Determination

At least one of the position and the size of a changing area in which applied voltage of capacitors formed between the n driving electrodes and the respective detection electrodes changes because of the influence of an external capacity is determined from an obtained comparison result.

Specific Method for Detection Processing

Under the basic concept explained above, a specific method of "sequentially comparing a detection signal with the threshold Vt, measuring, with a clock counter or the like, time from ON to OFF of an output waveform of the detection signal, and calculating the position and the size of the detection object from a result of the measurement" is easily conceivable.

However, with such a specific method, even if the position and the size in the scanning direction can be detected, it is difficult to perform detection in an array direction of the detection lines (an X coordinate direction) orthogonal to the scanning direction. Therefore, another detection algorithm is necessary to perform real time processing in the array direction of the detection lines (the X coordinate direction).

A specific method for detection processing performed by using a bitmap (hereinafter referred to as bitmap detection processing) explained below is a method with which determination is possible not only in the Y coordinate direction but also in the X coordinate direction on a real time basis.

Figure 10:
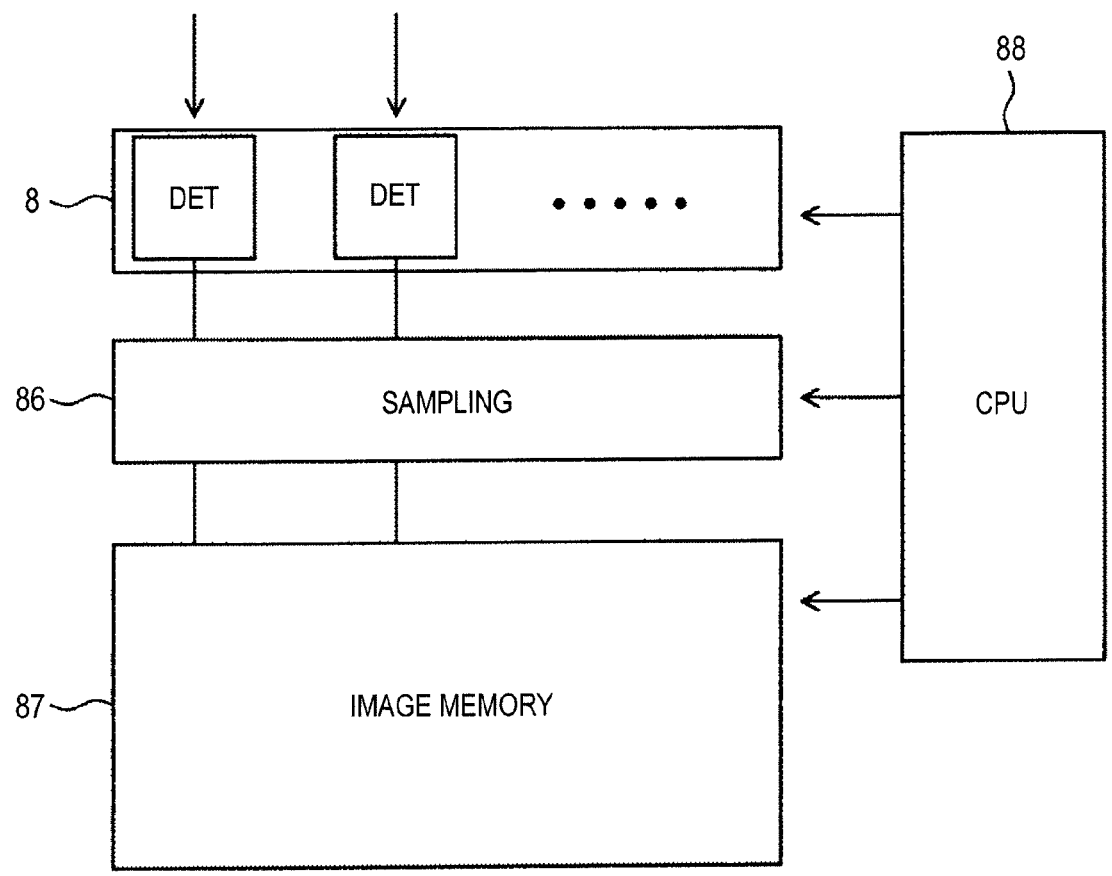
FIG. 10 is a block diagram including executing means for bitmap detection processing according to the first embodiment.
Figure 11:
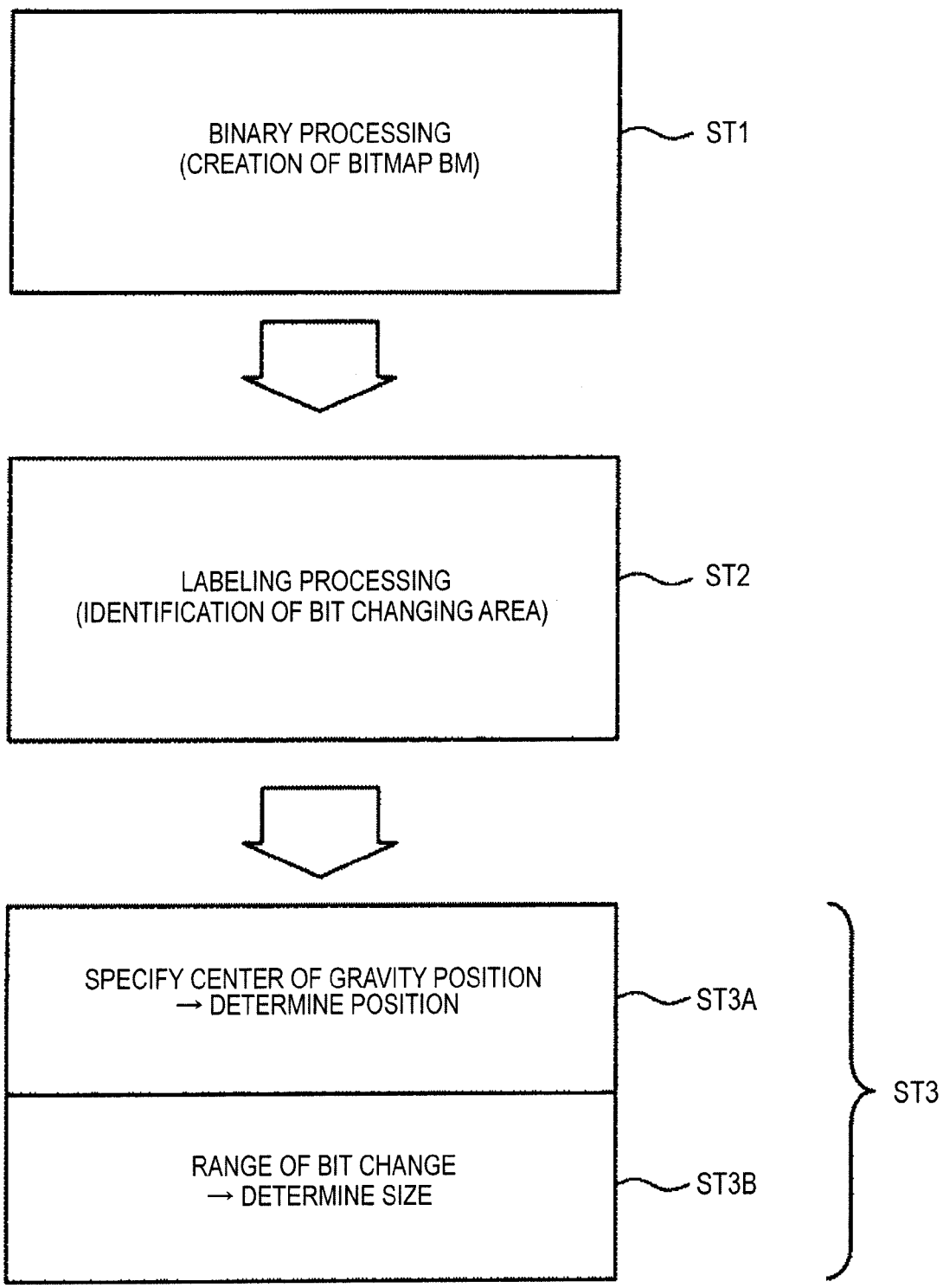
FIG. 11 is a flowchart of a main procedure of the bitmap detection processing according to the first embodiment.
Figure 12:
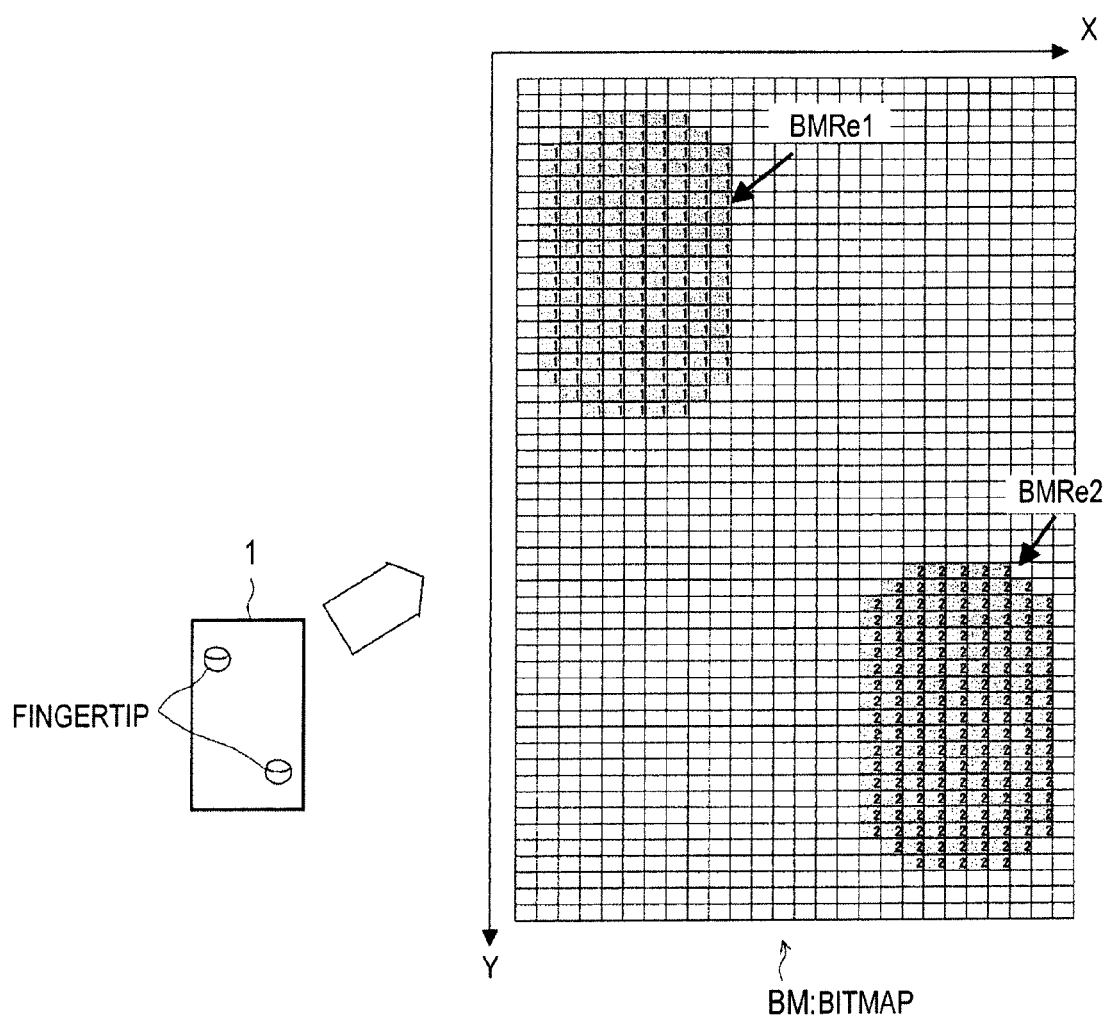
FIG. 12 is a schematic diagram of a bitmap expansion example according to the first embodiment.

FIG. 10 is a block diagram of a specific configuration example of the "detection processing unit" connected to the detecting unit 8 as executing means for the bitmap detection processing. FIG. 11 is a flowchart of a main procedure of the bitmap detection processing. FIG. 12 is a schematic diagram of a bitmap expansion example.

As shown in FIG. 10, the "detection processing unit" includes a sampling unit 86 that generates bit information by sampling an output waveform of the detecting unit 8 in which the voltage detectors DET are arranged in an X direction.

Further, the "detection processing unit" includes an image memory 87 that expands the bit information generated by the sampling unit 86 in a memory space and creates a bitmap and a control unit 88 such as a CPU. The control unit 88 is means for controlling the detecting unit 8, the sampling unit 86, and the image memory 87. The control unit 88 may be means for controlling the entire contact detecting device including these units.

In the bit information input to the image memory 87 from the sampling unit 86, for example, a dot determined as larger than the threshold Vt by the voltage detector is represented by "1" and a dot determined as equal to or smaller than the threshold Vt is represented by "0".

In the example shown in FIG. 12, a fingertip is in contact with distant two places on the detection surface of the contact detecting device 1.

Processing content is explained below with reference to FIG. 11 by using this contact example.

In step ST1 in FIG. 11, the sampling unit 86 shown in FIG. 10 performs binarization of bit information, sequentially expands the bit information in the image memory, and stores the bit information to thereby create a bitmap BM.

In the bitmap BM, in the example of FIG. 12, one dot (or bit) corresponds to one grating. The bitmap BM is formed of set of bits with white void gratings representing "0" and gray gratings representing "1". In an initial state in which the finger as the detection object does not come into contact with or approach the contact detecting device 1, the entire bitmap BM is in a state of all-bit "0" including white void gratings.

From this state, when the finger comes into contact with the contact detecting device 1, bits in an area of a section corresponding to the contact change. In the example of FIG. 12, a bit change area formed by the first contact of the finger is represented by "BMRe1" and a bit change area formed by the second contact of the finger is represented by "BMRe2".

In step ST2 in FIG. 11, the detection processing unit performs identification of the bit changing areas in processing on the created bitmap BM. This processing is called labeling processing and is mainly executed by the control unit 88.

After the labeling processing, the detection processing unit distinguishes the bit changing areas as separate areas (contact objects) according to identification numbers or the like of the bit changing areas BMRe1 and BMRe2. For example, as schematically shown in FIG. 12, identification numbers "1" and "2" are allocated to the bit changing areas BMRe1 and BMRe2.

The detection processing unit may determine whether the bit changing area is a contact object according to an area shape. When the shape of the bit changing area is a complicated area shape that may not be recognized as a finger or a pen tip, the detection processing unit does not have to determine that the bit changing area is not the contact object. In this case, if, for example, the palm or the back of the hand unintentionally touches the touch detecting device 1, the detection processing unit may suspend processing after that.

When the determination step for the area shape is inserted to determine whether the processing should be continued or suspended, power consumption and a load on hardware due to unnecessary processing can be reduced.

In step ST3 in FIG. 11, the detection processing unit determines at least one of the position and the size of the detection object. Step ST3 includes step ST3A for determining the position and step ST3B for determining the size. Contents of the steps ST3A and ST3B may be opposite to those shown in the figure.

In step ST3A, the detection processing unit calculates center of gravity positions in the X direction and the Y direction for each bit changing area obtained with an identification number or the like set as an index. The center of gravity calculation can be executed by, for example, calculating averages of addresses concerning X addresses and Y addresses in the bit changing area. Consequently, a center of gravity coordinate of the bit changing area is calculated. The detection processing unit determines this center of gravity position as a contact position of the contact object.

In step ST3B, the detection processing unit calculates the size of the detection object from a range of the bit changing area. The size may be represented from maximum size in the X direction and maximum size in the Y direction. Maximum size (including maximum size in an oblique direction) on the bitmap may be calculated.

In the bitmap processing explained above, the detection processing unit calculates the position and the size with the processing after once expanding the detection information obtained by the comparison with the threshold in the memory area. If the detection processing unit performs the determination of the contact position and the size of the last frame while comparing a detection signal with the threshold concerning a certain frame, real time processing is possible. The determination of the position and the size can be substantially simultaneously performed in the X direction and the Y direction. Maximum size and the like in an oblique direction can be easily calculated.

To ensure the real time property, a memory space twice as large as a necessary amount may be prepared and, while a bitmap is created in a half of the memory space, processing for determining the position and the size of the detection object from the bitmap may be executed in the other half.

Advantages of the method of contact detection indicated by the first embodiment are explained below with reference to a comparative example.

COMPARATIVE EXAMPLE

Figure 13:
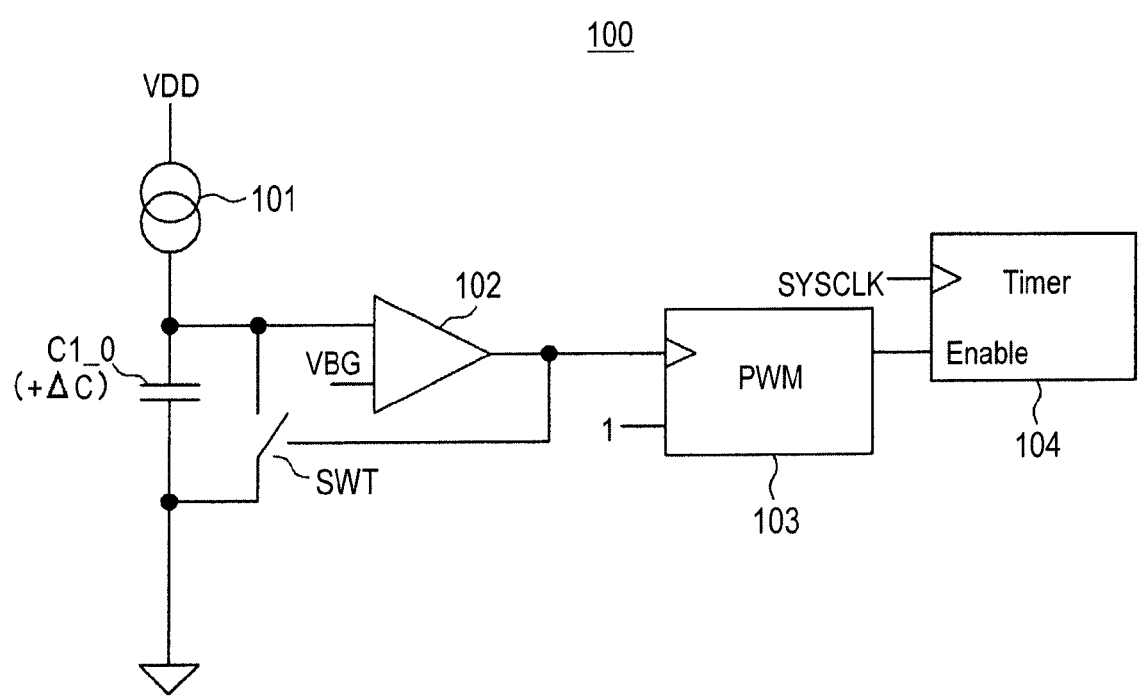
FIG. 13 is a diagram of a driving and detection circuit according to a comparative example of the first embodiment.

A comparative example concerning the circuit shown in FIG. 5 according to this embodiment is shown in FIG. 13.

A driving and detection circuit 100 shown in FIG. 13 is a circuit that performs driving for the capacitative element C1_0 same as that shown in FIG. 5 and detection of a holding potential change. The driving and detection circuit 100 includes a current source 101, a switch SWT, a comparator 102, a pulse modulation circuit (PWM) 103, and a timer circuit 104.

The current source 101 is connected to one electrode of the capacitative element C1_0, whereby the capacitative element C1_0 is charged. The switch SWT is connected between one electrode and the other electrode of the capacitative element C1_0 and controls formation of a discharge path of the capacitive element C1_0. The switch SWT is controlled according to the output of the comparator 102.

The comparator 102 is a circuit that compares charging potential of one electrode of the capacitative element C1_0 with reference potential VBG and generates a pulse. When one electrode of the capacitative element C1_0 is charged and the potential thereof exceeds the reference potential VBG, a pulse rises in the output of the comparator 102. However, when the output of the comparator 102 changes to the high level, the switch SWT is turned on and discharge is started. Therefore, the output pulse of the comparator 102 immediately ends.

The charge and the discharge are alternately performed because of a circuit configuration. Therefore, a continuous pulse at a fixed period is output from the comparator 102. The pulse is used as an input clock of the PWM 103. The PWM 103 is a circuit that pulse-width-modulates an input pulse (represented as "1"). Output pulse width thereof changes according to the input clock. The output of the PWM 103 is input to an enable terminal of the timer circuit 104. The timer circuit 104 measures time of an enable period with a period of an input system clock SYSCLK set as a unit.

A capacitance value of the capacitive element C1_0 rises by ΔC as the finger (the detection object) approaches the contact detecting device 1. Then, speed for charging the capacitive element C1_0 per unit time falls in appearance. Therefore, the width of the pulse output from the comparator 102 increases according to ΔC. Therefore, an input clock frequency of the PWM 103 falls and the width of the output pulse from the PWM 103 increases. Measuring time of the timer circuit 104 also increases according to the fall in the input clock frequency and the increase in the width of the output pulse.

The driving and detection circuit 100 of the capacitance-type touch sensor that is configured and operates as explained above performs contact detection once when pulses are generated several tens to several hundreds times. Therefore, the driving and detection circuit 100 has relatively long driving time in one border width because of an operation principle thereof. Conversely, the driving and detection circuit 100 has a circuit configuration for surely detecting contact by monitoring contact detection over a relatively long time. Therefore, the driving and detection circuit 100 is suitable for surely detecting intentional contact with a switch of a light or the like and neglecting short unintended contact.

On the other hand, the driving and detection circuit 100 is unsuitable for, for example, use in advanced information input associated with display content of the display panel because responsiveness to contact detection is low.

In the circuit and the method for driving and detection explained in this embodiment, even if detection accuracy for detecting a fine detection object is increased, a peak value of the detection signal Vdet does not have to be reduced and, rather, can be increased. Therefore, potential comparison for contact detection does not need to be performed tens to hundreds times as shown in FIG. 10. Only one potential comparison has to be performed for each DC driving. Therefore, in this embodiment, there is an advantage that it is possible to provide a contact detecting device that has extremely short time from a potential change to determination of presence or absence and the position of the detection object and has high responsiveness.

Second Embodiment

In a second embodiment of the present invention, driving electrodes that are provided further in the inside of a panel than detection electrodes of a touch sensor (electrodes on a display surface side that a finger or the like approaches) and between which and the detection electrodes capacitors are formed are also used as electrodes for liquid crystal control. The electrodes are desirably provided to be opposed to both the detection electrodes and pixel electrodes. Therefore, the electrodes are hereinafter simply referred to as "counter electrodes".

On the other hand, as the electrodes for liquid crystal control, a common electrode (so-called Vcom driving electrode) provided in common to plural pixels in order to apply an electric field to a display function layer such as a liquid crystal layer is provided to be opposed to the pixel electrodes for the respective pixels and used. In liquid crystal display control, a common driving signal Vcom given to the common electrode is voltage as a reference of signal voltage. In a well-known low-power consumption driving, as a method of substantially halving an absolute value of voltage in use, the common driving signal Vcom is AC-pulse-driven. This AC driving is also effective for preventing deterioration in a characteristic of liquid crystal.

In this embodiment, for example, the common driving signal Vcom driven by an alternating current such as AC pulse driving to control liquid crystal or the like is also used as driving voltage for the touch sensor. In other words, the counter electrode of the touch sensor is also used as the common electrode for liquid crystal driving.

Naturally, the AC driving of the counter electrodes has to match Vcom driving. This is a demand for display driving (a first demand).

The touch sensor desirably not only detects that the finger or the like approaches or comes into contact with a display surface of a display device but also detects an operation position in the display surface of the finger or the like. For example, when images of plural buttons are displayed, it is necessary to detect which of the buttons is operated. Therefore, the common electrode for display driving and the electrode (the counter electrode) also serving for driving power for the touch sensor are divided into plural electrodes. This is for the purpose of detecting an operation position according to in which of the counter electrodes a capacitance change occurs in a range in which driving of display pixel lines is not hindered.

More specifically, only one divided counter electrode located in an area including a pixel line set as a target of scanning for display driving is AC-pulse-driven. According to the movement (scanning) of the pixel line to be subjected to display driving, the counter electrodes that should be AC-pulse-driven for contact detection are moved (scanned). While the target of the display driving and the AC pulse driving for the contact detection is scanned, it is also possible to monitor a capacitance change and, as in the first embodiment, perform position determination for the finger or the like using the threshold Vt.

The above is the demand for position detection for the touch sensor when the common electrode for display control and the sensor driving electrode are used in common (a second demand).

Further, it is likely that inconveniences explained below occur when electrode driving for the touch sensor is applied to a part in a screen in order to meet the second demand.

When a pixel line closest to the end of the counter electrode is displayed and scanning shifts to the next pixel line, operation for switching the AC pulse driving for the counter electrode to the next counter electrode side is performed according to the shift. Therefore, slight fluctuation in driving voltage affects the display of the pixel lines. In other words, in the entire display screen, there is fear of deterioration in an image quality that causes a boundary of the counter electrodes to slightly appear as a line.

On the other hand, if the counter electrodes are finely sectioned for the respective pixel lines, the counter electrode to be AC-pulse-driven is also switched in every display driving for each of the pixel lines. At this point, since a condition for switching the AC pulse driving for the counter electrode is equal for all the pixel lines, the line of the boundary is not easily seen. A switching frequency for the pixel electrodes is close to a driving frequency of the common driving signal Vcom. Therefore, when the counter electrodes are provided for the respective pixel lines, even if there is slight fluctuation in driving voltage, the fluctuation is less easily seen for human eyes.

Further, if the counter electrodes are also finely sectioned for the respective pixel lines, the resolution in the column direction of the touch sensor is increased. However, the voltage (the sensor voltage Vs) obtained when the common driving signal Vcom of the common electrodes is transmitted to the detection electrodes via the capacitors is reduced. Therefore, an S/N ratio is affected by noise and falls.

Consequently, when the counter electrodes are divided and sequentially driven for the position detection for the touch sensor, the deterioration in the image quality due to the appearance of the switching line of the counter electrode as the driving target and the securing of the magnitude of the sensor voltage Vs (securing of the S/N ratio) are in a tradeoff relation. The increase in the resolution of the touch sensor and the securing of the S/N ratio are also in a trade-off relation.

Overcoming or relaxing this tradeoff is a third demand requested when the sensor driving electrode and the common electrode for display driving are shared.

Two embodiments explained below include the structure of the counter electrodes and a driving method therefor for satisfying one or more of the first to third demands.

However, as in the first embodiment, the detection method for comparing the analog detection signal Vdet output from the counter electrodes (equivalent to the driving electrodes) with the threshold Vt is common to all embodiments explained later. The basics of the capacitance-type contact detection already explained with reference to FIGS. 1A and 1B to FIGS. 3A to 3C are the same in the embodiments. The basic configuration of the detection drive scanning unit 11 shown in FIG. 5 (in the embodiments explained below, referred to as Vcom driving circuit 9) and the basic configuration of the detecting unit 8 are common to the first embodiment. The relation between the number of divisions and detection accuracy and the way of shifting shown in FIGS. 6A and 6B and FIGS. 7A to 7C can be applied in this embodiment by reading "driving electrodes" as "counter electrodes". The method of determining the position and the size of the detection object shown in FIGS. 8A to 8C and FIGS. 9A to 9C can also be applied in this embodiment. The bitmap detection processing explained with reference to FIGS. 10 to 12 can be applied as in the first embodiment.

Differences of a display device according to this embodiment from the first embodiment are mainly explained in detail with reference to the drawings.

Figure 15:
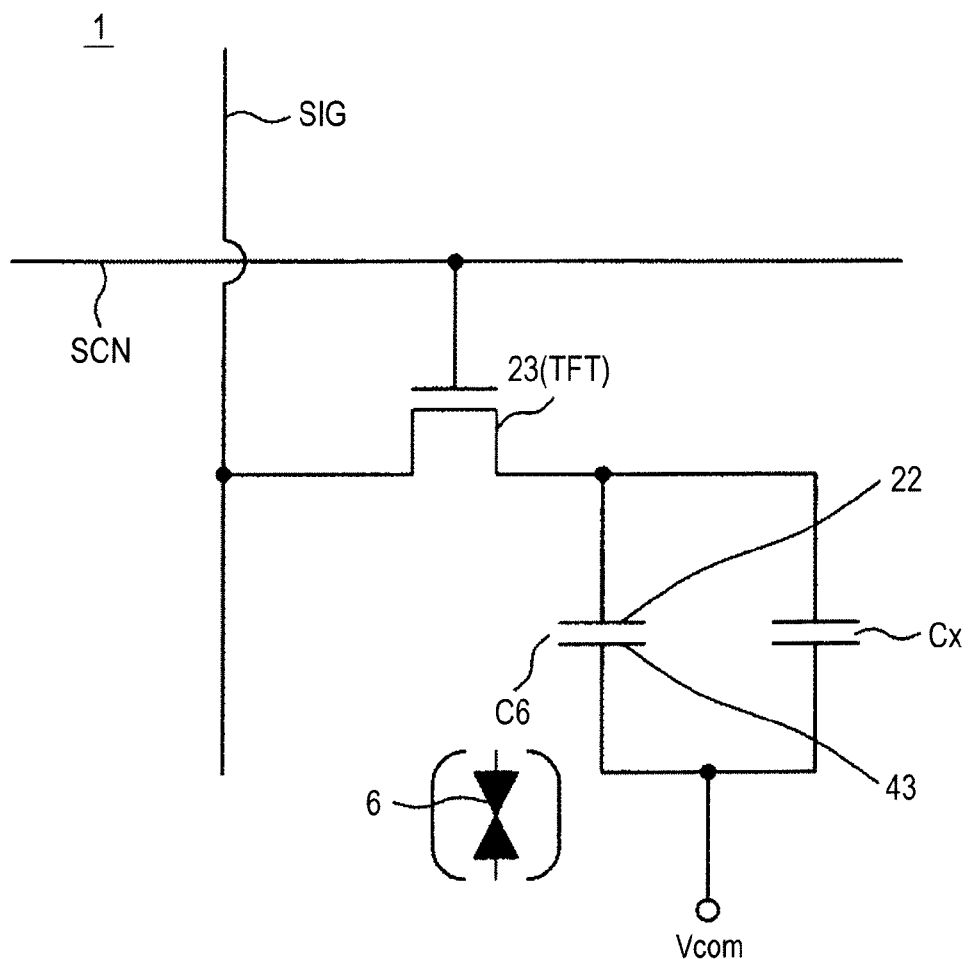
FIG. 15 is an equivalent circuit diagram of a pixel of the display device according to the second embodiment.

FIGS. 14A to 14C are plan views for specifically explaining electrodes of the display device according to this embodiment and the arrangement of circuits for driving and detection of the electrodes. FIG. 14D is a schematic sectional view of sectional structure of the display device according to this embodiment. In FIG. 14D, a section for six pixels in, for example, a row direction (a pixel display line direction) is shown. FIG. 15 is an equivalent circuit diagram of a pixel.

The display device shown in FIGS. 14A to 14C is a liquid crystal display device including a liquid crystal layer as a "display function layer".

As explained above, the liquid crystal display device includes, as electrodes common to plural pixels, electrodes (counter electrodes) applied with the common driving signal Vcom for giving reference voltage with respect to signal voltage for gradation display for the respective pixels. In this embodiment, the counter electrodes are also used as electrodes for sensor driving.

In the liquid crystal display panel 1, pixels shown in FIG. 15 are arranged in a matrix.

Each of the pixels includes, as shown in FIG. 15, a thin film transistor (TFT; hereinafter represented as TFT 23) as a select element for pixels, an equivalent capacitor C6 of the liquid crystal layer 6, and a holding capacitor (also referred to as additional capacitor) Cx. Electrodes on one side of the equivalent capacitor C6 representing the liquid crystal layer 6 are pixel electrodes 22 arranged in a matrix separated for each of the pixels and an electrode on the other side is a counter electrode 43 common to plural pixels.

The pixel electrodes 22 are connected to one of a source and a drain of the TFT 23. A signal line SIG is connected to the other of the source and the drain of the TFT 23. The signal line SIG is connected to a not-shown vertical driving circuit (see FIGS. 14A to 14C related to the embodiments explained later). A video signal having signal voltage is supplied to the signal line SIG from the vertical driving circuit.

The common driving signal Vcom is given to the counter electrode 43. The common driving signal Vcom is a signal obtained by inverting positive potential and negative potential for each horizontal period (1H) with reference to center potential.

A gate of the TFT 23 is electrically set in common to all the pixels arranged in a row direction, i.e., a lateral direction of a display screen, whereby a scanning line SCN is formed. The scanning line SCN is supplied with a gate pulse output from the not-shown vertical driving circuit and used for opening and closing the gate of the TFT 23. Therefore, the scanning line SCN is also referred to as gate line.

As shown in FIG. 15, the holding capacitor Cx is connected in parallel to the equivalent capacitor C6. The holding capacitor Cx is provided to prevent storage capacitance from becoming insufficient in the equivalent capacitor C6 to cause a fall in writing potential due to a leak current or the like of the TFT 23. The addition of the holding capacitor Cx is also useful for prevention of flicker and improvement of uniformity of screen luminance.

The liquid crystal display panel 1 in which such pixels are arranged includes, in the sectional structure (FIG. 14D), the driving substrate 2 on which the TFT 23 shown in FIG. 15 is formed in a place not appearing in the section and to which a driving signal (signal voltage) of the pixels is supplied. The liquid crystal display panel 1 includes the counter substrate 4 arranged to be opposed to the driving substrate 2 and the liquid crystal layer 6 arranged between the driving substrate 2 and the counter substrate 4.

The driving substrate 2 includes a TFT substrate 21 (a substrate body section is made of glass or the like) as a circuit board on which the TFT 23 shown in FIG. 15 is formed and plural pixel electrodes 22 arranged in a matrix on the TFT substrate 21.

A not-shown display driver (a vertical driving circuit, a horizontal driving circuit, etc.) for driving the pixel electrodes 22 is formed on the TFT substrate 21. The TFT 23 shown in FIG. 15 and wires such as the signal line SIG and the scanning line SCN are formed on the TFT substrate 21. The voltage detector DET (see FIG. 5) that performs touch detecting operation may be formed on the TFT substrate 21.

The counter substrate 4 includes a glass substrate 41, a color filter 42 formed on one side of the glass substrate 41, and the counter electrode 43 formed on (on the liquid crystal layer 6 side of) the color filter 42. The color filter 42 is configured by periodically arraying, for example, color filer layers of three colors red (R), green (G), and blue (B). One of the three colors R, G, and B is associated with each of the pixels (or the pixel electrodes 22). A pixel associated with one color may be referred to as "sub-pixel", and a set of sub-pixels of the three colors R, G, and B may be referred to as "pixel". However, in this specification, the sub-pixel is also represented to as "pixel PIX".

The counter electrode 43 is also used as a sensor driving electrode that forms a part of a touch sensor that performs touch detecting operation. The counter electrode 43 is equivalent to the driving electrode E1 shown in FIGS. 1A and 1B and FIGS. 2A and 2B.

The counter electrode 43 is coupled to the TFT substrate 21 by a contact conducive column 7. The common driving signal Vcom having an AC pulse waveform is applied from the TFT substrate 21 to the counter electrode 43 via the contact conductive column 7. The common driving signal Vcom is equivalent to the AC pulse signal Sg supplied from the driving signal source S shown in FIGS. 1A and 1B and FIGS. 2A and 2B.

Detection electrodes 44 (44_1 to 44_k) are formed on the other side (the display surface side) of the glass substrate 41. A protective layer 45 is formed on the detection electrodes 44. The detection electrodes 44 form a part of the touch sensor and is equivalent to the detection electrode E2 shown in FIGS. 1A and 1B and FIGS. 2A and 2B. The voltage detector DET (see FIG. 5) that performs touch detecting operation may be formed in the glass substrate 41.

The liquid crystal layer 6 as the "display function layer" modulates light transmitted in a thickness direction (a direction opposed to the electrodes) according to a state of an electric field applied thereto. Liquid crystal materials of various modes such as TN (twisted nematic), VA (vertical alignment), and ECB (electrically controlled birefringence) are used for the liquid crystal layer 6.

Orientation films are respectively disposed between the liquid crystal layer 6 and the driving substrate 2 and between the liquid crystal layer 6 and the counter substrate 4. Sheet polarizers are respectively arranged on a reverse display surface side (i.e., a rear surface side) of the driving substrate 2 and on the display surface side of the counter substrate 4. These optical function layers are not shown in FIGS. 4A to 4D.

As shown in FIG. 14A, the counter electrode 43 is divided in a direction of a row or a column of a pixel array and, in this example, in the direction of the column (a longitudinal direction of the figure). The direction of the division corresponding to a scanning direction of pixel lines in display driving, i.e., a direction in which the not-shown vertical driving circuit sequentially activates the scanning line SCN.

The counter electrode 43 is divided into n in total because of necessity for also serving as a driving electrode.

Therefore, the counter electrodes 43_1, 43_2, ..., 43_m, and 43_n are planarly arranged to have a belt-like pattern long in the row direction and laid in parallel in the plane spaced apart from one another.

At least m (<n), which is equal to or larger than 2, counter electrodes among the counter electrodes 43_1 to 43_n divided into n are simultaneously driven. Specifically, the common driving signal Vcom is simultaneously applied to the m counter electrodes 43_1 to 43_m and the potential thereof repeats inversion in each horizontal period (1H). In the other counter electrodes, potential does not fluctuate because a driving signal is not given to the other counter electrodes. A bundle of the simultaneously-driven counter electrodes configures the AC driving electrode unit EU same as that in the first embodiment.

In this embodiment, the number of counter electrodes is a fixed number m for each of AC driving electrode units EU. While a combination of the counter electrodes to be bound is changed, the AC driving electrode unit EU shifts stepwise in the column direction. In other words, a combination of the counter electrodes selected as the AC driving electrode unit EU changes every time the AC driving electrode unit EU shifts. When the shift is performed twice, only one divided counter electrode is excluded from the selection. Instead, a divided counter electrode is selected anew.

The Vcom driving with such an AC driving electrode unit EU of counter electrodes set as a unit and the shift operation of the AC driving electrode unit EU are performed by the Vcom driving circuit 9 as the "detection drive scanning unit" provided in the not-shown vertical driving circuit (a writing driving and scanning unit). The operation of the Vcom driving circuit 9 can be regarded as equal to "operation for moving the driving signal source S (see FIGS. 1A and 1B and FIGS. 2A and 2B), which simultaneously Vcom-AC-drives wires of the m counter electrodes, in the column direction and performing scanning in the column direction while changing, one by one, the counter electrode to be selected".

On the other hand, the detection electrode 44 includes plural stripe electrode patterns (detection electrodes 44_1 to 44_k) extending in a separating direction of the electrode patterns (the counter electrodes 43_1 to 43_n) of the counter electrode 43. Detection signals Vdet are respectively output from the k detection electrodes 44_1 to 44_k. These k detection signals Vdet are input to the detecting unit 8 having the voltage detector DET shown in FIGS. 1A and 1B and FIGS. 2A and 2B as a basic detection unit.

FIGS. 14A and 14B are diagrams divided for explanation of the electrode patterns. However, actually, as shown in FIG. 14C, the counter electrodes 43_1 to 43_n and the detection electrodes 44_1 to 44_k are arranged to be superimposed such that position detection in a two-dimensional plane is possible.

With this configuration, the detecting unit 8 can detect a position in the row direction according to in which voltage detector DET a voltage change occurs. The detecting unit 8 can obtain position information in the column direction according to timing of the detection. In other words, it is assumed that the Vcom driving of the Vcom driving circuit 9 and the operation of the detecting unit 8 are synchronized by, for example, a clock signal having a predetermined period. According to such synchronization operation, it is seen which of the divided counter electrodes the Vcom driving circuit 9 drives when the detecting unit 8 obtains a voltage change. Therefore, a contact position center of the finger can be detected. Such detection operation is controlled by a not-shown computer-based supervisory control circuit that supervises the entire liquid crystal display panel 1, for example, a CPU or a microcomputer or a control circuit for touch detection.

The Vcom driving circuit 9 as the "detection drive scanning unit" is formed on the driving substrate 2 side shown in FIG. 14D. However, the detecting unit 8 as the "detecting unit" may be provided either on the driving substrate 2 side or the counter substrate 4 side. Since a large number of TFTs are integrated, it is desirable to form the detecting unit 8 together with the driving substrate 2 in order to reduce the number of manufacturing steps. However, since the detection electrode 44 is present on the counter substrate 4 side and made of a transparent electrode material, wiring resistance may be high. In such a case, to prevent the deficiency of the high wiring resistance, it is desirable to form the detecting unit 8 on the counter substrate 4 side. However, if a TFT forming process is used to form the counter substrate 4 only for the detecting unit 8, there is a disadvantage that cost is high.

It is advisable to determine a formation position of the detecting unit 8 generally taking into account the advantages and the disadvantages explained above.

The operation of the display device having the configuration is explained below.

The display driver (the horizontal driving circuit, the vertical driving circuit, etc. not shown in the figure) of the driving substrate 2 line-sequentially supplies the common driving signal Vcom to the electrode patterns (the counter electrodes 43_1 to 43_n) of the counter electrode 43. A method of selecting the counter electrodes and a method of shift are as explained above. The common driving signal Vcom is also used for counter electrode potential control for image display.

The display driver supplies signal voltage to the pixel electrodes 22 via the signal line SIG and line-sequentially controls switching of the TFTs of the pixel electrodes via the scanning line SCN in synchronization with the supply of the signal voltage. Consequently, an electric field in a longitudinal direction (a direction perpendicular to the substrate) determined by the common driving signal Vcom and pixel signals is applied to the liquid crystal layer 6 for each of pixels and modulation of a liquid crystal state is performed. In this way, display by so-called inverted driving is performed.

On the other hand, on the side of the counter substrate 4, the capacitative elements C1 are respectively formed in crossing sections of the electrode patterns (the counter electrodes 43_1 to 43_n) of the counter electrode 43 and the electrode patterns (the detection electrodes 44_1 to 44_k) of the detection electrode 44. When the common driving signal Vcom is sequentially applied to the electrode patterns of the counter electrode 43 in a time division manner, charge and discharge are applied to the capacitative elements C1 for one column formed in the crossing sections of the electrode patterns of the counter electrode 43 and the electrode patterns of the detection electrode 44 to which the common driving signal Vcom is applied. As a result, the detection signals Vdet having magnitude corresponding to the capacitance value of the capacitative element C1 are respectively output from the electrode patterns of the detection electrode 44. In a state in which the finger of the user does not touch the surface of the counter substrate 4, the magnitude of the detection signals Vdet is substantially fixed (the sensor voltage Vs). According to the scanning of the common driving signal Vcom, the column of the capacitative elements C1 as the targets of the charge and discharge line-sequentially move.

When the finger of the user touches any place on the surface of the counter substrate 4, the capacitative element C2 formed by the finger is added to the capacitative element C1 originally formed in the touched place. As a result, the touched place is scanned. A value (the sensor voltage Vs) of the detection signal Vdet at the time when the common driving signal Vcom is applied to the driving electrode corresponding to the touched place is smaller than those in other places. In other words, the sensor voltage Vf is smaller than the sensor voltage Vs. The detecting unit 8 (FIG. 5) compares the detection signal Vdet with the threshold Vt and, when the detection signal Vdet is equal to or smaller than the threshold Vt, determines the place as the touched place. The touched place can be calculated from application timing of the common driving signal Vcom and detection timing of the detection signal Vdet equal to or smaller than the threshold Vt.

As explained above, according to this embodiment, the common electrode (the counter electrode 43) for liquid crystal driving originally provided in the liquid crystal display element is also used as one (the driving electrode) of the pair of touch sensor electrodes including the driving electrode and the detection electrode. In this embodiment, the common driving signal Vcom as the display driving signal is also used as the touch sensor driving signal. Therefore, an electrode to be provided anew only has to be the detection electrode 44. It is unnecessary to prepare the touch sensor driving signal anew. Therefore, a configuration is simplified.

The plural counter electrodes are simultaneously AC-driven. The simultaneously-AC-driven electrode group is shifted such that all the counter electrodes are selected in two times of AC driving. Therefore, as in the first embodiment, both the S/N ratio and the sensor detection accuracy can be maintained at high levels.

A switching frequency of the AC driving is equal to the 1H inverted frequency of the common driving signal Vcom. This frequency is an extremely high frequency obtained by multiplying a commercial power supply frequency, for example, 60 Hz by the number of pixels in the column direction. For example, when the number of pixels in the column direction is 480, this frequency is 28.8 Hz. A frequency of a pulse waveform is 14.4 Hz half as high as 28.8 Hz. Therefore, an image change due to the shift of the AC driving has a sufficiently high frequency that may not be visually recognized by human eyes.

Consequently, both the prevention of a fall in the S/N ratio due to a fall in sensor voltage and the prevention of deterioration in an image quality due to switching of electrode driving can be realized.

The realization of both the prevention of a fall in the S/N ratio and the prevention of deterioration in an image quality due to switching of electrode driving is not an indispensable requirement. Therefore, the improvement of sensor detection accuracy may take priority over the prevention of deterioration in an image quality.

According to this embodiment, further, since the driving electrode and the driving circuit for the common driving signal Vcom can also be used as the sensor driving electrode and the driving circuit, an arrangement space and power consumption can be saved.

In FIGS. 14A to 14D, the detection electrode 44 is shown as a line having small width. However, the detection electrode 44 may be formed in large width in the row direction. When a capacitance value of the capacitative element C1 is too small and desired to be increased, the electrode width can be increased. Conversely, for example, when a capacitance value of the capacitative element C1 is too large because the dielectric D is thin and desired to be reduced, the electrode width can be reduced.

Alternatively, the detection electrode 44 may be divided in the column direction to draw out wires from the respective divided isolated patterns in the column direction. The voltage detectors DET may be connected to the respective wires. However, one voltage detector DET may be shared by the plural detection electrodes 44 in order to prevent circuit size from increasing. For example, one voltage detector DET may be shared by the detection electrodes 44 in one column to perform detection for each of the detection electrodes 44 in a time division manner with the voltage detector DET.

Third Embodiment

A third embodiment of the present invention is explained below. In this embodiment, unlike the second embodiment, a liquid crystal element of a horizontal field mode is used as a display element.

Figure 16:
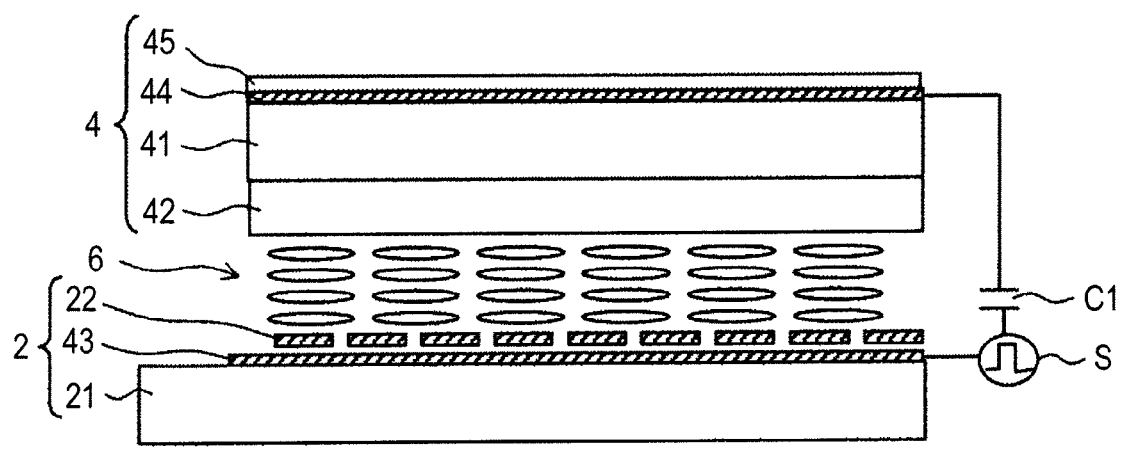
FIG. 16 is a schematic sectional view of a display device according to a third embodiment of the present invention.

FIG. 16 is a schematic sectional diagram of a display device according to this embodiment. In FIG. 16, components same as those in the second embodiment are denoted by the same reference numerals and signs. Explanation of the components is omitted as appropriate.

The display device according to this embodiment is different from that according to the second embodiment in that the counter electrode 43 is arranged on the driving substrate 2 side. The counter electrode 43 in this embodiment is arranged to be opposed to the pixel electrodes 22 on an inverse liquid crystal layer side of the pixel electrodes 22. The opposed arrangement is not specifically shown in the figure. A distance between the pixel electrodes 22 is set relatively large. The counter electrode 43 causes an electric field to act on the liquid crystal layer 6 from a space between the pixel electrodes 22. In other words, liquid crystal display of the horizontal field mode in which the electric field acts on the liquid crystal layer 6 in the horizontal direction is performed.

The other components are the same in the third embodiment and the second embodiment as long as the arrangement in the section is concerned.

The capacitative element C1 is formed between the detection electrode 44 and the counter electrode 43. Therefore, compared with the second embodiment (FIG. 14D), a capacitance value is low. However, a large electrode space can be compensated by increasing electrode width. Sensitivity may be increased because of a relation with the capacitative element C2.

The liquid crystal layer 6 modulates light transmitted through the liquid crystal layer 6. For example, liquid crystal of a FFS (fringe field switching) mode, an IPS (in-plane switching) mode, and the like is used.

The display device is explained more in detail with reference to FIGS. 17A and 17B.

In a liquid crystal element of the FFS mode shown in FIGS. 17A and 17B, the pixel electrodes 22 patterned in a comb tooth shape are arranged, via the insulating film 25, on the counter electrode 43 formed on the driving substrate 2. An orientation film 26 is formed to cover the pixel electrodes 22. The liquid crystal layer 6 is held between the orientation film 26 and an orientation film 46 on the counter substrate 4 side. Two sheet polarizers 24 and 45 are arranged in a state of cross Nichol. A rubbing direction of the two orientation films 26 and 46 coincides with a transmission axis of one of the two sheet polarizers 24 and 45. In FIGS. 17A and 17B, the rubbing direction coincides with the transmission axis of the protective layer 45 on an emission side. The rubbing direction of the two orientation films 26 and 46 and the direction of the transmission axis of the protective layer 45 is set substantially parallel to an extending direction of the pixel electrodes 22 (a longitudinal direction of the comb teeth) in a range in which a rotating direction of liquid crystal molecules is specified.

The operation of the display device having such a configuration is explained below.

Figure 18A:
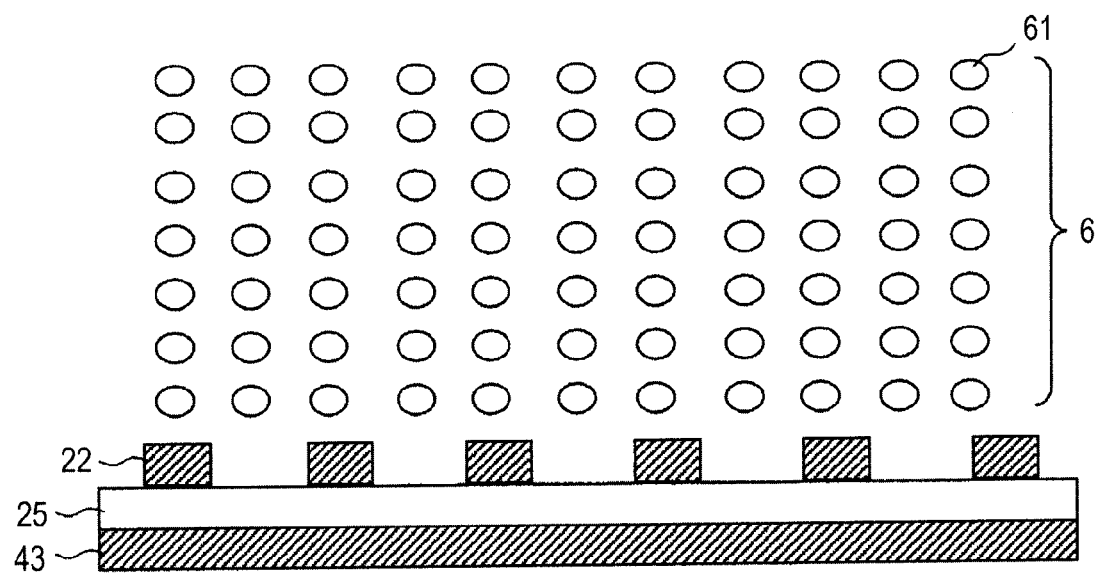
FIGS. 18A and 18B are sectional views for explaining the operation shown in FIGS. 17A and 17B.
Figure 18B:
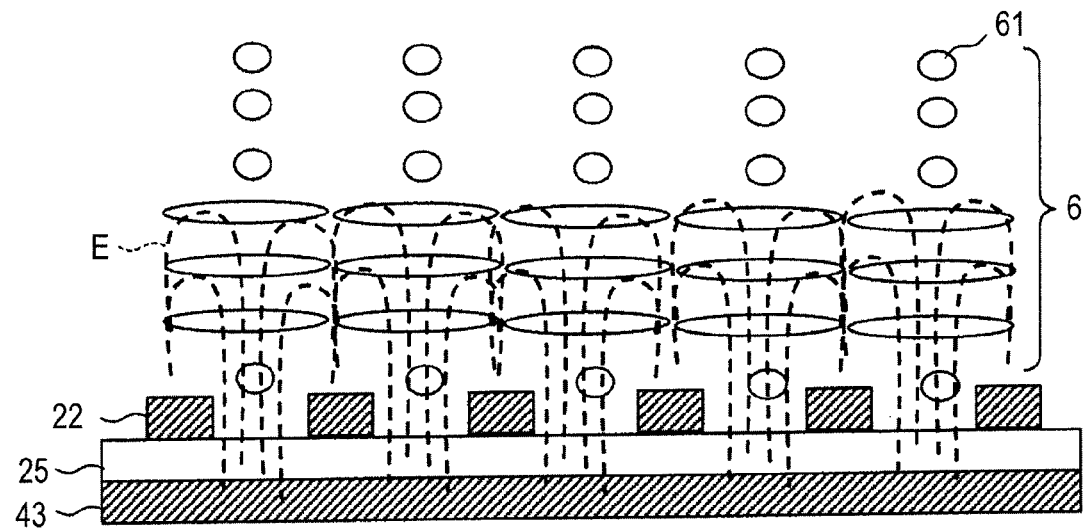

First, a display operation principle of the liquid crystal element of the FFS mode is briefly explained with reference to FIGS. 17A and 17B and FIGS. 18A and 18B. FIGS. 18A and 18B are diagrams of an enlarged main part section of the liquid crystal element. A state of the liquid crystal element during non-application of an electric field is shown in FIGS. 17A and 18A. A state of the liquid crystal element during application of an electric field is shown in FIGS. 17B and 18B.

In a state in which voltage is not applied between the counter electrode 43 and the pixel electrodes 22 (FIGS. 17A and 18A), axes of liquid crystal molecules 61 forming the liquid crystal layer 6 are orthogonal to the transmission axis of the sheet polarizer 24 on an incidence side and parallel to the transmission axis of the protective layer 45 on the emission side. Therefore, incident light h transmitted through the sheet polarizer 24 on the incidence side reaches the protective layer 45 on the emission side without causing a phase difference in the liquid crystal layer 6 and is absorbed by the protective layer 45. Therefore, black display is performed. On the other hand, in a state in which voltage is applied between the counter electrode 43 and the pixel electrodes 22 (FIGS. 17B and 18B), an orientation direction of the liquid crystal molecules 61 is rotated in an oblique direction relatively to the extending direction of the pixel electrodes 22 by a horizontal electric field E generated among the pixel electrodes 22. When the orientation direction is rotated, field intensity during white display is optimized such that the liquid crystal molecules 61 located in the center in the thickness direction of the liquid crystal layer 6 rotates about 45 degrees. Consequently, a phase difference occurs in the incident light h transmitted through the sheet polarizer 24 on the incidence side while the incident light h is transmitted through the liquid crystal layer 6. The incident light h changes to linear polarized light rotated 90 degrees and is transmitted through the protective film 45 on the emission side. Therefore, white display is performed.

Concerning the touch sensor unit, only electrode arrangement in sectional structure is different. Basic operation is the same as that in the first and second embodiments. Specifically, the counter electrode 43 is driven in the column direction by repeating the Vcom AC driving and the shift. A difference between the sensor voltages Vs and Vf at that point is read via the voltage detector DET. The sensor voltage Vs read as a digital value is compared with the threshold Vt. A position of the contact or approach of the finger is detected in a matrix shape.

In the same manner as explained with reference to FIGS. 7A to 7C, m (m=7 in FIGS. 7A to 7C) counter electrodes 43 are simultaneously AC-driven. After one counter electrode 43 corresponding to one writing unit is shifted, the counter electrodes 43 are AC-driven again. The shift and the AC driving are repeated. Therefore, a value of n in the formula shown in FIG. 6C is reduced to 1/m of an actual number of divisions. The sensor voltage Vs increases according to the reduction in the value of n. On the other hand, as shown in FIGS. 7A to 7C, a unit of new inclusion in a selected group and exclusion from the selected group due to the inclusion is one counter electrode corresponding to one pixel line. Therefore, the S/N ratio and the sensor detection accuracy can be maintained at high levels.

A switching frequency of the AC driving may be equal to the 1H inverted frequency of the common driving signal Vcom. This frequency is an extremely high frequency obtained by multiplying a commercial power supply frequency, for example, 60 Hz by the number of pixels in the column direction. For example, when the number of pixels in the column direction is 480, this frequency is 28.8 Hz. A frequency of a pulse waveform is 14.4 Hz half as high as 28.8 Hz. This is a sufficiently high frequency that may not be visually recognized by human eyes.

Consequently, both the prevention of a fall in the S/N ratio due to a fall in sensor voltage and the prevention of deterioration in an image quality due to switching of electrode driving can be realized.

In addition to the effects explained above, as in the second embodiment, since the electrodes for the Vcom driving and the sensor driving are shared, there is an advantage that a configuration is simple. Since the driving electrode and the driving circuit for the common driving signal Vcom can also be used as the sensor driving electrode and the sensor driving circuit, an arrangement space and power consumption can be saved.

More specifically, in the liquid crystal modes (the modes such as Va, TN, and ECB) in which the transparent electrode material (ITO) is present on the counter substrate side, the potential of the counter substrate for driving needs to be raised from TFT elements. Therefore, a large number of contacts are necessary between the TFT substrate and the counter electrode and the structure of the display device is complicated.

On the other hand, in the liquid crystal display device of the horizontal field mode according to the third embodiment, there is no such factor that complicates the structure. The liquid crystal display device is also desirable in that regard.

The present application contains subject matter related to that disclosed in Japanese Priority Patent Application JP 2008-261777 filed in the Japan Patent Office on Oct. 8, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A contact detecting device comprising:
n driving electrodes that are arranged in a scanning direction;
a detection drive scanning unit that selects continuous m ($2 \leq m < n$) driving electrodes out of the n driving electrodes, simultaneously AC-drives the selected m driving electrodes, and repeats shift operation for changing selection targets of the m driving electrodes in the scanning direction such that one or more driving electrodes common before and after the shift operation performed each time are included in the selection targets;
plural detection electrodes that form capacitors, between which and the respective n driving electrodes capacitors are formed;
plural detection circuits that are connected to the plural detection electrodes and compare potentials of the detection electrodes corresponding thereto with a predetermined threshold every time the detection drive scanning unit performs the shift operation.

2. A contact detecting device according to claim 1, wherein the respective plural detection circuits are connected in a one-to-one relation to the plural detection electrodes and generate a detection signal that takes different logical values when the potentials of the detection electrodes corresponding thereto exceed the threshold and when the potentials do not exceed the threshold.

3. The contact detecting device according to claim 2, further comprising a detection processing unit that receives input of a plurality of the detection signals from the plural detection circuits and specifies, according to processing on a bitmap obtained by time-sampling the input plural detection signals, a center of gravity position of a bit changing area on the bitmap.

4. The contact detecting device according to claim 3, wherein the detection processing unit calculates an average coordinate point of the bit changing area in each of two directions, i.e., the scanning direction and a direction orthogonal to the scanning direction, specifies the center of gravity position from obtained two average coordinate points, and determines, from the specified center of gravity position, a position of a detection object that causes a change in the capacitors.

5. The contact detecting device according to claim 2, further including a detection processing unit that receives input of a plurality of the detection signals from the plural detection circuits, calculates, according to processing on a bitmap obtained by time-sampling the input plural detection signals, a range of a bit changing area on the bit map, and determines size of a detection object that causes a change in the capacitors.

6. The contact detecting device according to claim 1, wherein the detection drive scanning unit repeats the shift operation with one driving electrode set as a unit such that (m−1) driving electrodes common in continuous two times of the AC driving are included in the selection targets.

7. A contact detecting device comprising:
n driving electrodes that are arranged in a scanning direction at a fixed pitch;
plural detection electrodes, between which and the respective n driving electrodes capacitors are formed;
a detection drive scanning unit that performs driving operation for simultaneously AC-drives m ($2 \leq m < n$) driving electrodes continuous in the scanning direction and repeats, with size in the scanning direction of the driving electrodes smaller in number than m set as an amount of shift for one time, shift operation for changing a combination of the simultaneously-driven m driving electrodes in the scanning direction; and
plural detection circuits that are connected to the plural detection electrodes in a one-to-one relation and compare potentials of the detection electrodes corresponding thereto with a predetermined threshold every time the detection drive scanning unit performs the shift operation.

8. A display device comprising:
plural pixel electrodes that are provided for the respective pixels and planarly arranged in a matrix;
n counter electrodes that are planarly arranged to be opposed to the pixel electrodes, have pitch length natural number times as large as pitch length of an array of the pixel electrodes in a scanning direction, which is one arranging direction of the pixel electrodes, and are arranged at equal intervals in the scanning direction;
plural detection electrodes, between which and the respective n counter electrodes capacitors are formed;
a display function layer that shows an image display function according to signal voltage applied between the pixel electrodes and the counter electrodes opposed to each other;
a detection drive scanning unit that selects continuous m ($2 \leq m < n$) counter electrodes out of the n counter electrodes, simultaneously AC-drives the selected m counter electrodes, and repeats shift operation for changing selection targets of the m counter electrodes in the scanning direction such that one or more driving electrodes common before and after the shift operation performed each time are included in the selection targets; and
plural detection circuits that are connected to the plural detection electrodes in a one-to-one relation and compare potentials of the detection electrodes corresponding thereto with a predetermined threshold every time the detection drive scanning unit performs the shift operation.

9. A display device comprising:
plural pixel electrodes that are provided for the respective pixels and planarly arranged in a matrix;
n counter electrodes that are planarly arranged to be opposed to the pixel electrodes, have pitch length natural number times as large as pitch length of an array of the pixel electrodes in a scanning direction, which is one arranging direction of the pixel electrodes, and are arranged at equal intervals in the scanning direction;
plural detection electrodes, between which and the respective n counter electrodes capacitors are formed;
a display function layer that shows an image display function according to signal voltage applied between the pixel electrodes and the counter electrodes opposed to each other;

a detection drive scanning unit that performs driving operation for simultaneously AC-driving m (2≦m<n) counter electrodes continuous in the scanning direction and repeats, with size in the scanning direction of the counter electrodes smaller in number than m set as an amount of shift for one time, shift operation for changing a combination of the simultaneously-driven m counter electrodes in the scanning direction; and plural detection circuits that are connected to the plural detection electrodes in a one-to-one relation and compare potentials of the detection electrodes corresponding thereto with a predetermined threshold every time the detection drive scanning unit performs the shift operation.

10. A contact detecting method comprising the steps of:

selecting continuous m (2≦m<n) driving electrodes out of n driving electrodes arranged in a scanning direction;

simultaneously AC-driving the selected m driving electrodes and repeating shift operation for changing selection targets of the m driving electrodes in the scanning direction such that one or more driving electrodes common before and after the shift operation performed each time are included in the selection targets;

comparing potentials of the respective driving electrodes with a predetermined threshold every time the shift operation is performed; and determining, from an obtained comparison result, at least one of position and size of a changing area in which applied voltage of capacitors formed between the n driving electrodes and the respective detection electrodes changes because of influence of an external capacity.

11. A contact detecting method according to claim 10, wherein the comparing the potentials with the threshold includes generating a detection signal that takes different logical values when potentials of the detection electrodes corresponding to the driving electrodes exceed the threshold and when the potentials do not exceed the threshold, and the determining at least one of position and size includes specifying a center of gravity position of a bit changing area on a bitmap obtained by time-sampling a plurality of the detection signals.

12. A contact detecting method according to claim 11, wherein the determining at least one of position and size includes calculating an average coordinate point of the bit changing area in each of two directions, i.e., the scanning direction and a direction orthogonal to the scanning direction, specifying the center of gravity position from obtained two average coordinate points, and determining, from the specified center of gravity position, a position of a detection object that causes a change in the capacitors.

13. A contact detecting method according to claim 10, wherein the comparing the potentials with the threshold includes generating a detection signal that takes different logical values when potentials of the detection electrodes corresponding to the driving electrodes exceed the threshold and when the potentials do not exceed the threshold, and the determining at least one of position and size includes calculating a range of a bit changing area on a bitmap obtained by time-sampling a plurality of detection signals and determining, from the obtained range of the bit changing area, size of a detection object that causes a change in the capacitors.

14. A contact detecting method according to claim 10, wherein the repeating the shift operation includes repeating the shift operation with one driving electrode set as a unit such that (m−1) driving electrodes common in continuous two times of the AC driving are included in the selection targets.

15. A contact detecting method comprising the steps of:

performing driving operation for simultaneously AC-driving continuous m (2≦m<n) driving electrodes out of n driving electrodes arranged in the scanning direction and repeating, with size in the scanning direction of the driving electrodes smaller in number than m set as an amount of shift for one time, shift operation for changing a combination of the simultaneously-driven m driving electrodes in the scanning direction;

comparing potentials of the respective driving electrodes with a predetermined threshold every time the shift operation is performed; and determining, from an obtained comparison result, at least one of position and size of a changing area in which applied voltage of capacitors formed between the n driving electrodes and the respective detection electrodes changes because of influence of an external capacity.

* * * * *